US009690445B2

(12) United States Patent
Rice et al.

(10) Patent No.: US 9,690,445 B2
(45) Date of Patent: Jun. 27, 2017

(54) CONTROLLING A COMPUTING DEVICE

(71) Applicant: Metaswitch Networks Ltd, Enfield (GB)

(72) Inventors: Liz Rice, Enfield (GB); Philip Pearl, Enfield (GB); Felix Palmer, Enfield (GB); Shaun Crampton, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 328 days.

(21) Appl. No.: 13/939,542

(22) Filed: Jul. 11, 2013

(65) Prior Publication Data

US 2013/0298076 A1 Nov. 7, 2013

Related U.S. Application Data

(63) Continuation of application No. PCT/GB2012/050076, filed on Jan. 13, 2012.
(Continued)

(30) Foreign Application Priority Data

Mar. 18, 2011 (GB) .................................. 1104627.3

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 9/4443* (2013.01); *G09G 5/14* (2013.01)

(58) Field of Classification Search
CPC ........ G06F 3/0481; G06F 9/4443; G09G 5/14
(Continued)

(56) References Cited

U.S. PATENT DOCUMENTS

2005/0044500 A1  2/2005  Orimoto et al.
2007/0049335 A1*  3/2007  Haitani ................. G06F 3/0481
                                                                455/556.2
(Continued)

FOREIGN PATENT DOCUMENTS

EP         2312427 A2    4/2011
WO    2005/057392 A1    6/2005

OTHER PUBLICATIONS

Written Opinion and Search Report issued in corresponding International Application No. PCT/GB2012/050076 on Jul. 30, 2012.
(Continued)

*Primary Examiner* — Abdullah Al Kawsar
*Assistant Examiner* — Jian Yu
(74) *Attorney, Agent, or Firm* — EIP US LLP

(57) ABSTRACT

Methods, apparatus and computer program products for controlling a computing device comprising a touch-screen user interface. A status of one or more applications having access to the touch-screen user interface of the computing device is monitored. In response to the monitoring indicating that a predetermined application is displaying a screen on the touch-screen user interface, at least one overlay portion is configured over a part of the displayed screen. Hence, an augmented user interface experience is provided which allows display of information to a user via an overlay displayed on top of information associated with a predetermined application already being presented to the user. No interaction by the user with the touch-screen user interface is required in order to navigate away from or back to the predetermined application.

17 Claims, 20 Drawing Sheets

Related U.S. Application Data

(60) Provisional application No. 61/432,445, filed on Jan. 13, 2011, provisional application No. 61/442,776, filed on Feb. 14, 2011.

(51) Int. Cl.
*G06F 9/44* (2006.01)
*G09G 5/14* (2006.01)

(58) Field of Classification Search
USPC .......................................................... 715/781
See application file for complete search history.

(56) References Cited

U.S. PATENT DOCUMENTS

| | | | |
|---|---|---|---|
| 2007/0078706 A1 | 4/2007 | Datta et al. | |
| 2007/0157089 A1 | 7/2007 | Van Os et al. | |
| 2008/0022279 A1 | 1/2008 | Jung | |
| 2008/0168349 A1 | 7/2008 | Lamiraux et al. | |
| 2008/0168367 A1 | 7/2008 | Chaudhri et al. | |
| 2008/0225014 A1* | 9/2008 | Kim | 345/173 |
| 2008/0246743 A1* | 10/2008 | Ward | G06F 3/0488 345/173 |
| 2008/0272907 A1* | 11/2008 | Bonansea | H04M 1/72519 340/539.11 |
| 2009/0061837 A1 | 3/2009 | Chaudhri et al. | |
| 2009/0158205 A1 | 6/2009 | Hampton et al. | |
| 2010/0029302 A1* | 2/2010 | Lee | H04W 4/02 455/456.6 |
| 2010/0162165 A1 | 6/2010 | Addala et al. | |
| 2010/0293511 A1* | 11/2010 | Agnetta et al. | 715/864 |
| 2011/0016415 A1* | 1/2011 | Nam et al. | 715/764 |
| 2011/0148776 A1* | 6/2011 | Hautala | G06F 3/0481 345/173 |
| 2011/0267367 A1* | 11/2011 | Tsai et al. | 345/629 |
| 2011/0319136 A1* | 12/2011 | Labowicz | G06F 3/04883 455/566 |

OTHER PUBLICATIONS

"Libretto W1090—User's Manual", 2010, Toshiba Co., XP002679428, pp. 4-1-pp. 4-5.
WOS: "Functions of Windows Operating Systems Task Manager", HubPages, Jan. 4, 2010, XP002679429.

\* cited by examiner

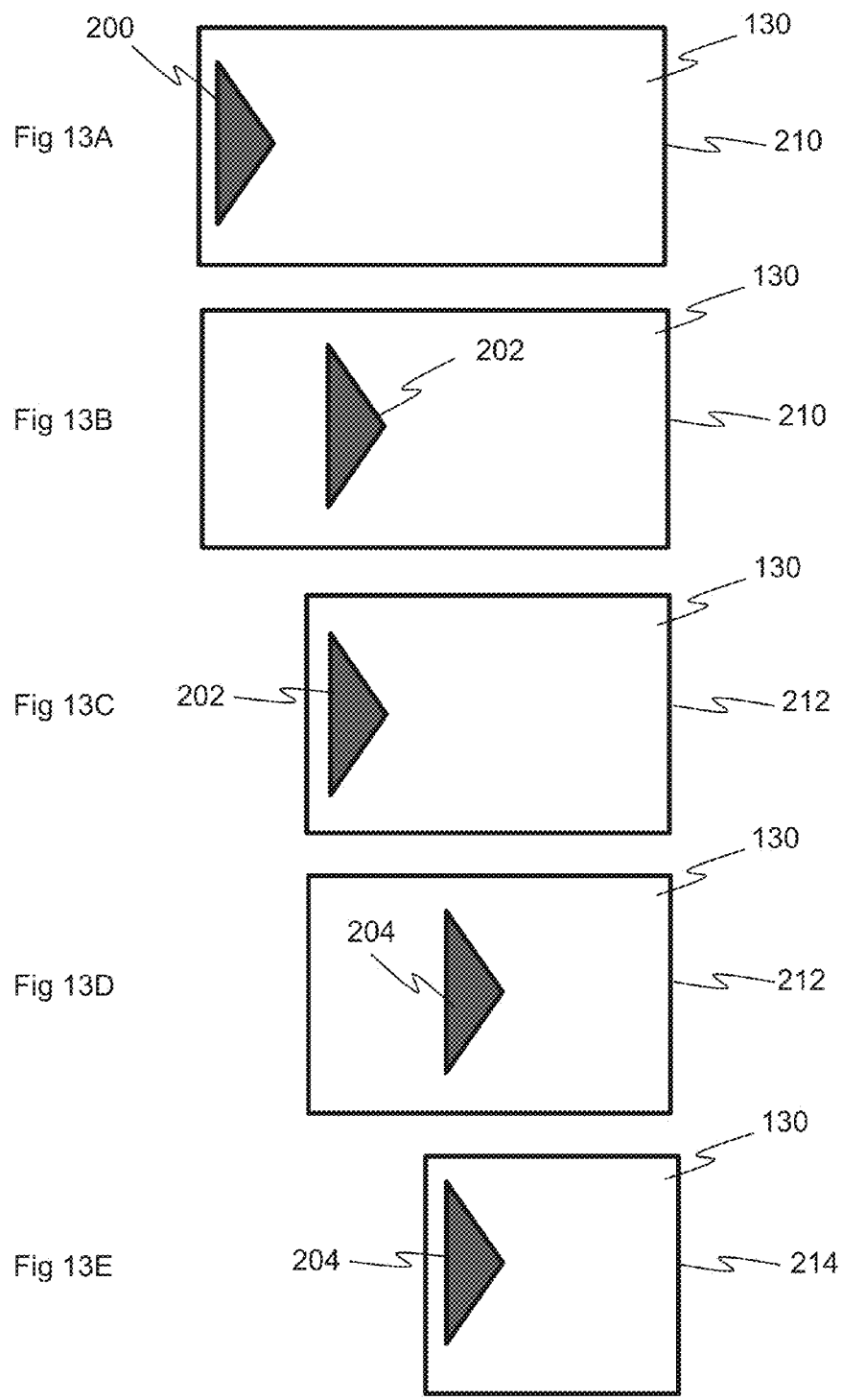

CONTROLLING A COMPUTING DEVICE

CROSS REFERENCE TO RELATED APPLICATION

This application is a continuation of International Application no. PCT/GB2012/050076, filed Jan. 13, 2012 and designating the U.S., which claims benefit under 35 U.S.C. §119(a) and 37 CFR 1.55 to U.S. Provisional Patent Application No. 61/432,445, filed Jan. 13, 2011, U.S. Provisional Patent Application No. 61/442,776, filed Feb. 14, 2011, and Great Britain Patent Application no. 1104627.3, filed Mar. 18, 2011, the entire contents of which are hereby incorporated by reference.

TECHNICAL FIELD

The present disclosure relates to control of a computing device. In particular, but not exclusively, the present disclosure relates to control of a mobile telephony device having a touch-screen user interface.

BACKGROUND

Known computing devices support execution of application software, also known as applications or 'apps', for providing a wide variety of tasks. Many known computing devices have a touch-screen user interface through which a user can control operation of an application by user input in the form of touches on a touch-sensitive screen. To open an application, a user will usually press a soft-key icon associated with the application which is displayed on the home screen of the device, or select the application from a menu using one or more hard-wired input keys. When the application opens, it will typically display a screen with a number of touch-sensitive soft-key icons or menus through which the user can control the application.

If a user wishes to switch from using one application to another application, the user will have to navigate out of the application currently being used, open the other application and control it separately via input on a different screen display. During this time, the screen displayed by the application initially being used will have been removed. If the user then wishes to return to the application initially being used again, then the user will have to navigate back to that application, at which point the screen display will be switched back to a screen displayed by the initial application. Such user interaction is inefficient and can seem clumsy to the user thus detracting from the user experience.

The above problem is exacerbated if the computing device comprises a mobile telephony device and the user is conducting a call using their mobile telephony device such that an in-call screen application is displaying an in-call screen with soft-key icons associated with actions available during the call. If the user wishes to use a different application or function on their mobile telephony device during the call, the user has to navigate away from the in-call screen, control the other application, and then navigate back to the in-call screen application again afterwards. Such user interaction is undesirable during a call, not just because the local party to the call has to carry out the multiple navigation steps, but also because the remote party to the call is kept waiting and is unable to converse with the local party to the call whilst such navigation is taking place.

It would therefore be desirable to provide improved methods for user interaction with computing devices having touch-screen user interfaces, including user interaction associated with multiple software applications on mobile telephony devices.

SUMMARY

In accordance with first embodiments, there is a method of controlling a computing device comprising a touch-screen user interface, the method including:

monitoring a status of one or more applications having access to the touch-screen user interface of the computing device; and in response to the monitoring indicating that a predetermined application is displaying a screen on the touch-screen user interface, configuring at least one overlay portion over a part of the displayed screen. Hence, embodiments provide an augmented user interface experience as it allows display of information to a user via an overlay displayed on top of information associated with a predetermined application already being presented to the user. Embodiments require no interaction by the user with the touch-screen user interface in order to navigate away from or back to the predetermined application.

In one embodiment, configuring the at least one overlay portion includes configuring one or more touch-sensitive screen regions which are operable to initiate one or more operations of the computing device independently of the predetermined application in response to user input via the one or more touch-sensitive screen regions. Embodiments thus allow a user to provide user input either to the overlay portion or the predetermined application without the user having to navigate to/from the displayed screen.

In another embodiment, the method includes varying the size of the part of the displayed screen configured as the at least one overlay portion in response to user input via one or more of the touch-sensitive screen regions. Hence, a user may adjust the display of the overlay portion in relation to the display of the predetermined application.

Some embodiments involve the user input via the one or more of the touch-sensitive screen regions comprising a sliding action in a first given direction over the at least one overlay portion beginning at one of the touch-sensitive screen regions, wherein the size of the at least one overlay portion is reduced in response to the sliding action. The user is thus able to retract the overlay portion in order that parts of the display of the monitored application may be accessed.

Other embodiments involve the user input via the one or more of the touch-sensitive screen regions comprising a sliding action in a second given direction over the at least one overlay portion beginning at one of the touch-sensitive screen regions, wherein the size of the at least one overlay portion is increased in response to the sliding action. The user is thus able to retrieve (or 'pull out') the overlay portion from a retracted state.

In one embodiment, the method includes varying the number of the one or more touch-sensitive screen regions within the at least one overlay portion in conjunction with the size variation of the at least one overlay portion. The user is thus able to hide or reveal touch-sensitive screen regions of the overlay portion. The touch-sensitive screen regions may have the appearance of buttons indicating to the user that the regions may be touched or pressed in order to activate one or more operations of the computing device independently of the predetermined application.

In another embodiment, the method includes varying the location of the part of the displayed screen configured as the at least one overlay portion in response to user input via one or more of the touch-sensitive screen regions. Hence, a user may adjust the position of the overlay portion on the displayed screen at their convenience.

In embodiments, the at least one overlay portion includes a graphical overlay portion visible above the part of the displayed screen. Hence, the overlay portion allows for display of graphics on top of the displayed screen.

In embodiments, the at least one overlay portion includes a touch-sensitive overlay portion which is not visible above the part of the displayed screen. Hence, the overlay portion allows for capture of user input.

In some embodiments, the touch-sensitive overlay portion includes the one or more touch-sensitive screen regions, wherein the graphical overlay portion is not responsive to user input within the at least one overlay portion of the touch-screen user interface, and wherein the graphical overlay portion depicts the appearance of the one or more touch-sensitive screen regions. Hence, the appearance of the overlay portion can be controlled separately to the capture of user input via the overlay portion.

In other embodiments, when the size and/or location of the overlay portion over the displayed screen is varied in response to user input via the one or more of the touch-sensitive screen regions, the method includes:

displaying, via the visible graphical overlay portion of the at least one overlay portion, an animation of the at least one overlay portion varying from its unvaried size and/or location to its varied size and/or location;

reconfiguring the visible graphical overlay portion of the at least one overlay portion in its varied size and/or location; and reconfiguring the invisible touch-sensitive overlay portion of the at least one overlay portion in its varied size and/or location. Hence, screen flicker associated with variation of the size and/or location of the overlay portion can be avoided.

In one embodiment, at least a first part of the graphical overlay portion includes a translucent layer such that the part of the screen displayed by the predetermined application below the at least first part of the graphical overlay portion is partially visible through the at least first part of the graphical overlay portion. Hence, information displayed in the overlay portion is displayed in addition to information displayed by the predetermined application without information displayed by one obscuring that of the other.

In another embodiment, at least a second part of the graphical overlay portion includes an opaque layer such that the part of the screen displayed by the predetermined application below the at least second part of the graphical overlay portion is not visible through the at least second part of the graphical overlay portion. Hence, information displayed in the overlay portion can replace information displayed by the predetermined application.

In an embodiment, the computing device comprises a mobile telephony device, and the one or more of the operations comprise sending an instruction to a software application different from the predetermined application on the mobile telephony device. A user can thus control more than one application on their mobile telephony device via the same screen display. The user control may involve opening another application such as a camera, mapping, file browsing or address book application.

Embodiments comprise allowing user input received via the touch-screen user interface outside the overlay portion to pass to the predetermined application for processing. Hence, the user can interact with more than one application via the same screen display.

Embodiments comprise allowing user input received via the touch-screen user interface within the overlay portion to pass to the predetermined application for processing. Hence, all or some parts of the overlay portion can be used to display information to the user, rather than acting as a user interface for capturing input for application software associated with the overlay portion.

Arrangements comprise removing the configuration of the overlay portion over the part of the screen displayed by the monitored application in response to the monitoring indicating that the monitored application has ceased to display the screen on the touch-screen user interface. Hence, display of the overlay portion can be linked to the status of the predetermined application, with the overlay portion only being displayed when the predetermined application is displaying a screen to the user.

In embodiments, the computing device comprises a mobile telephony device, the predetermined application comprises an in-call screen application and the displayed screen comprises an in-call screen displayed during a call conducted by the mobile telephony device. Embodiments thus assists a user during a call by reducing the amount of in-call time spent navigating between applications.

In an embodiment, the status of the one or more applications is updated upon occurrence of a given operating system event of the computing device. Hence, triggering of the display of the overlay portion can be made dependent upon a given operating system event.

In another embodiment, the given operating system event is listed at a certain position in a task-list of the operating system of the computing device. Hence, triggering of the display of the overlay portion can be made dependent upon the position of a given operating system event in a task-list of the device, for example if the process of the predetermined application displaying a screen is listed at the top of the task-list.

In accordance with second embodiments, there is provided a method of controlling a computing device comprising a touch-screen user interface, the method comprising:

monitoring a status of one or more applications having access to the touch-screen user interface of the computing device; and in response to the monitoring indicating that an application has a predetermined status, in which the application is displaying a screen on the touch-screen user interface, configuring at least one overlay portion over a part of the displayed screen.

In accordance with third embodiments, there is provided application software for a mobile telephony device adapted to perform the method of the first or second embodiments.

In accordance with fourth embodiments, there is provided apparatus adapted to perform the method of the first or second embodiments.

In accordance with fifth embodiments, there is provided computer software adapted to perform the method of the first or second embodiments.

In accordance with embodiments, there is provided a computer program product comprising a non-transitory computer-readable storage medium having computer readable instructions stored thereon, the computer readable instructions being executable by a computerized device to cause the computerized device to perform a method of controlling a computing device comprising a touch-screen user interface according to the first or second embodiments.

In accordance with sixth embodiments, there is provided a method of controlling a computing device comprising a touch-screen user interface, the method comprising:

monitoring a status of one or more applications having access to the touch-screen user interface of the computing device;

in response to the monitoring indicating that a predetermined application is displaying a screen on the touch-screen user interface, using a different application to configure at least one overlay portion over a part of the displayed screen; and allowing user input received via the touch-screen user interface in one or more predefined touch-sensitive screen regions to pass to the predetermined application for processing while the overlay portion is active. Hence, embodiments provide an augmented user interface experience as it allows display of information to a user via an active overlay displayed on top of information associated with a predetermined application already being presented to the user. Embodiments require no interaction by the user with the touch-screen user interface in order to navigate away from or back to the predetermined application.

In one embodiment, configuring the at least one overlay portion includes configuring one or more overlay touch-sensitive screen areas which initiate one or more operations of the computing device, independently of operations which are configured to be initiated via the predetermined application, in response to user input via the one or more overlay touch-sensitive screen areas. Embodiments thus allow a user to provide user input either to the overlay portion or the predetermined application without the user having to navigate to/from the displayed screen.

In another embodiment, the method includes varying the size of the part of the displayed screen configured as the at least one overlay portion in response to user input via one or more of the overlay touch-sensitive screen areas. Hence, a user may adjust the display of the overlay portion in relation to the display of the predetermined application.

Some arrangements involve the user input via the one or more of the overlay touch-sensitive screen areas comprising a sliding action in a predetermined direction over the at least one overlay portion beginning at an overlay touch-sensitive screen area, wherein the size of at least one of the at least one overlay portion is reduced in response to the sliding action. The user is thus able to retract the overlay portion in order that parts of the display of the monitored application may be accessed.

Other arrangements involve the user input via the one or more of the overlay touch-sensitive screen areas comprising a sliding action in a predetermined direction over the at least one overlay portion beginning at an overlay touch-sensitive screen area, wherein the size of at least one of the at least one overlay portion is increased in response to the sliding action. The user is thus able to retrieve (or 'pull out') the overlay portion from a retracted state.

In one embodiment, the method includes varying the number of the one or more overlay touch-sensitive screen areas within the at least one overlay portion in conjunction with the size variation of the at least one overlay portion. The user is thus able to hide or reveal overlay touch-sensitive screen areas of the overlay portion. The overlay touch-sensitive screen areas may have the appearance of buttons indicating to the user that the areas may be touched or pressed in order to activate one or more operations of the computing device independently of the predetermined application.

In another embodiment, the method includes varying the location of the part of the displayed screen configured as the at least one overlay portion in response to user input via one or more of the overlay touch-sensitive screen areas. Hence, a user may adjust the position of the overlay portion on the displayed screen at their convenience.

In embodiments, the at least one overlay portion includes a graphical overlay portion visible above the part of the displayed screen. Hence, the overlay portion allows for display of graphics on top of the displayed screen.

In embodiments, the at least one overlay portion includes a touch-sensitive overlay portion which is not visible above the part of the displayed screen. Hence, the overlay portion allows for capture of user input.

In some embodiments, the touch-sensitive overlay portion includes the one or more touch-sensitive screen regions, wherein the graphical overlay portion is not responsive to user input within an overlay region of the touch-screen user interface which is not occupied by said touch-sensitive overlay portion, and wherein the graphical overlay portion depicts the appearance of the one or more overlay touch-sensitive screen areas within an overlay region of the touch-screen user interface which is occupied by said touch-sensitive overlay portion. Hence, the appearance of the overlay portion can be controlled separately to the capture of user input via the overlay portion.

In other embodiments, when the size and/or location of the overlay portion over the displayed screen is varied in response to user input via the one or more of the overlay touch-sensitive screen areas, the method includes:

displaying, via the visible graphical overlay portion of the at least one overlay portion, an animation of the visible graphical overlay portion varying from its unvaried size and/or location to its varied size and/or location; and reconfiguring the invisible touch-sensitive overlay portion of the at least one overlay portion to its varied size and/or location. Hence, screen flicker associated with variation of the size and/or location of the overlay portion can be avoided.

In one embodiment, at least a part of the graphical overlay portion includes a transparent or translucent graphical part such that the part of the screen displayed by the predetermined application below the transparent or translucent graphical part is at least partially visible through the transparent or translucent part. Hence, information displayed in the overlay portion is displayed in addition to information displayed by the predetermined application without information displayed by one obscuring that of the other.

In another embodiment, at least a part of the graphical overlay portion includes an opaque part such that the part of the screen displayed by the predetermined application below the opaque part of the graphical overlay portion is not visible through the opaque part. Hence, information displayed in the overlay portion can replace information displayed by the predetermined application.

An embodiment includes transmitting an application identifier for the predetermined application to a content provider and receiving, from the content provider, targeted graphical content for display on the graphical overlay portion, the graphical content being targeted to the computing device based on the identity of the predetermined application.

An embodiment includes displaying on the graphical overlay portion graphical content that is not being displayed on the screen displayed by the predetermined application.

In an embodiment, the graphical overlay portion includes one or more icons representing one or more overlay touch-sensitive screen areas.

In an embodiment, at least one of said one or more operations includes sending an instruction to a software application different from the predetermined application. A user can thus control more than one application on their computing device via the same screen display. The user control may involve opening another application such as a camera, mapping, file browsing, address book application, web browser application, file download application, media player application, media editing application or a messaging application. The instruction may comprise an instruction to open the web browser application at a predetermined network address. The predetermined network address may comprise a Uniform Resource Locator. The predetermined Uniform Resource Locator may comprise or be based on an affiliate identifier.

Embodiments comprise allowing user input received via the touch-screen user interface outside at least one of the at least one overlay portions to pass to the predetermined application for processing. Hence, the user can interact with more than one application via the same screen display.

Embodiments comprise allowing user input received via the touch-screen user interface within at least one of the at least one overlay portions to pass to the predetermined application for processing. Hence, all or some parts of the overlay portion can be used to display information to the user, rather than acting as a user interface for capturing input for application software associated with the overlay portion.

Embodiments comprise removing the configuration of the overlay portion over the part of the screen displayed by the monitored application in response to the monitoring indicating that the monitored application has ceased to display the screen on the touch-screen user interface. Hence, display of the overlay portion can be linked to the status of the predetermined application, with the overlay portion only being displayed when the predetermined application is displaying a screen to the user.

In embodiments, the computing device comprises a mobile telephony device, the predetermined application comprises an in-call screen application and the displayed screen comprises an in-call screen displayed during a call conducted by the mobile telephony device. Embodiments thus assist a user during a call by reducing the amount of in-call time spent navigating between applications.

In an embodiment, the status of the one or more applications is updated upon occurrence of a given operating system event of the computing device. Hence, triggering of the display of the overlay portion can be made dependent upon a given operating system event.

In another embodiment, the given operating system event is listed at a certain position in a task-list of the operating system of the computing device. Hence, triggering of the display of the overlay portion can be made dependent upon the position of a given operating system event in a task-list of the device, for example if the process of the predetermined application displaying a screen is listed at the top of the task-list.

In accordance with seventh embodiments, there is provided application software for a mobile telephony device adapted to perform the method of the sixth embodiments.

In accordance with eighth embodiments, there is provided apparatus adapted to perform the method of the sixth embodiments.

In accordance with ninth embodiments, there is provided computer software adapted to perform the method of the sixth embodiments.

In accordance with embodiments, there is provided a computer program product comprising a non-transitory computer-readable storage medium having computer readable instructions stored thereon, the computer readable instructions being executable by a computerized device to cause the computerized device to perform a method of controlling a computing device comprising a touch-screen user interface according to the sixth embodiments.

Further features and advantages will become apparent from the following description of preferred embodiments, given by way of example only, which is made with reference to the accompanying drawings.

BRIEF DESCRIPTION OF THE DRAWINGS

FIG. 13, which includes FIGS. 13A, 13B, 13C, 13D, 13E, 13F, 13G, and 13H, shows an overlay portion variation sequence according to embodiments.

DETAILED DESCRIPTION

Figure 1:
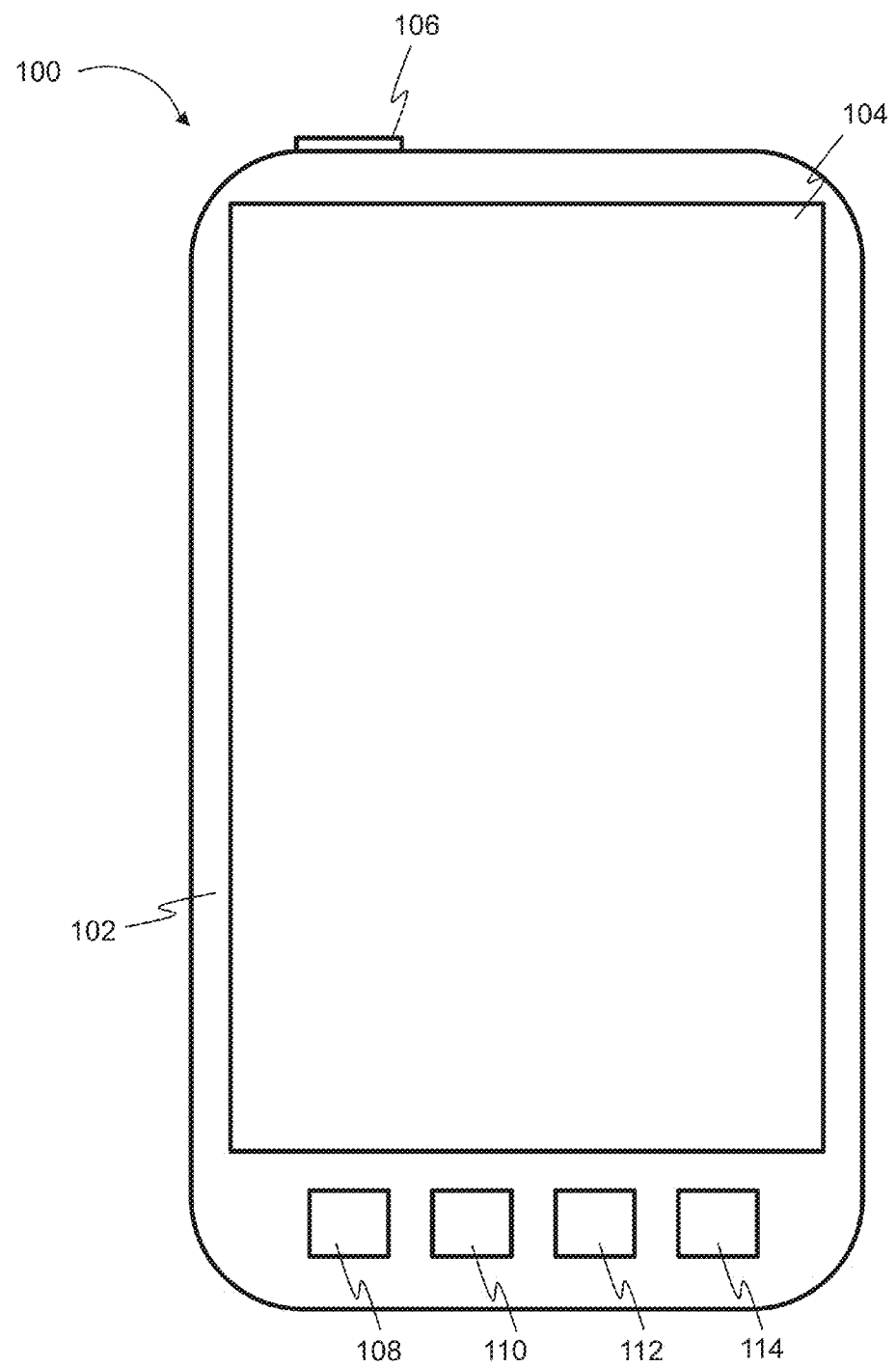
FIG. 1 shows a front view of a mobile telephony device according to embodiments.

FIG. 1 shows a front view of a computing device 100 according to embodiments. In FIG. 1 and the embodiments of the present disclosure described below, computing device 100 comprises an example mobile telephony device 100 and embodiments are described as application software running on mobile telephony device 100. Embodiments may equally be applied to a non-mobile computing device and/or a computing device without telephony capabilities such as a personal computer (PC) or suchlike. Further, embodiments need not necessarily comprise application software running on a mobile telephony device, but could comprise code programmed into Read Only Memory (ROM) within a computing device during manufacture or code incorporated into an operating system installed on a computing device.

Mobile telephony device 100 can comprise a variety of different hand-held devices, for example a smartphone, Personal Digital Assistant (PDA) or Personal Pocket Computer (PCC). Mobile telephony device 100 includes memory storage and one or more processors (not shown) for data processing purposes including implementation of an operating system, for example an Android™, Symbian™, Blackberry™ or Windows Phone™ operating system. The operating system provides a platform for execution of application software (or 'applications' or 'apps') for allowing a user to perform different tasks on mobile telephony device 100. The application software may be installed during manufacture or may be downloaded and installed by a user of mobile telephony device 100.

Mobile telephony device 100 includes a body 102, hard-wired input keys 108, 110, 112, 114 and a power on/off button 106. Mobile telephony device 100 includes a touch-screen user interface 104 which is operable to output a graphics display and receive input via user touches on the interface. Hard-wired input keys 108, 110, 112, 114 may be operable to execute common operations such as 'Open menu', 'Go to home screen', 'Go back to last screen', etc. Alternatively, one or more hard-wired input keys 108, 110, 112, 114 may be implemented as soft keys on touch-screen 104.

Mobile telephony device 100 supports a variety of different communication methods including telephony functionality enabling a user to conduct incoming and outgoing telephone calls with one or more remote users in a telecommunications network (not shown). Mobile telephony device 100 includes a number of components (not shown) which are known in the art, the operation of which is not described here in detail, including one or more radio frequency transceiver(s) and aerial(s), a speech coder/decoder connected to a loudspeaker and a microphone, and, in some embodiments, a removable Subscriber Identity Module (SIM) connected via electrical contacts.

Mobile telephony device 100 includes data transfer capabilities, including data packet input/output via a data input-output interface with one or more Internet Protocol (IP) parts of the telecommunications network. Mobile telephony device 100 may include messaging functionality, for example Short Message Service (SMS) and Multimedia Messaging Service (MMS) messaging.

Figure 2:
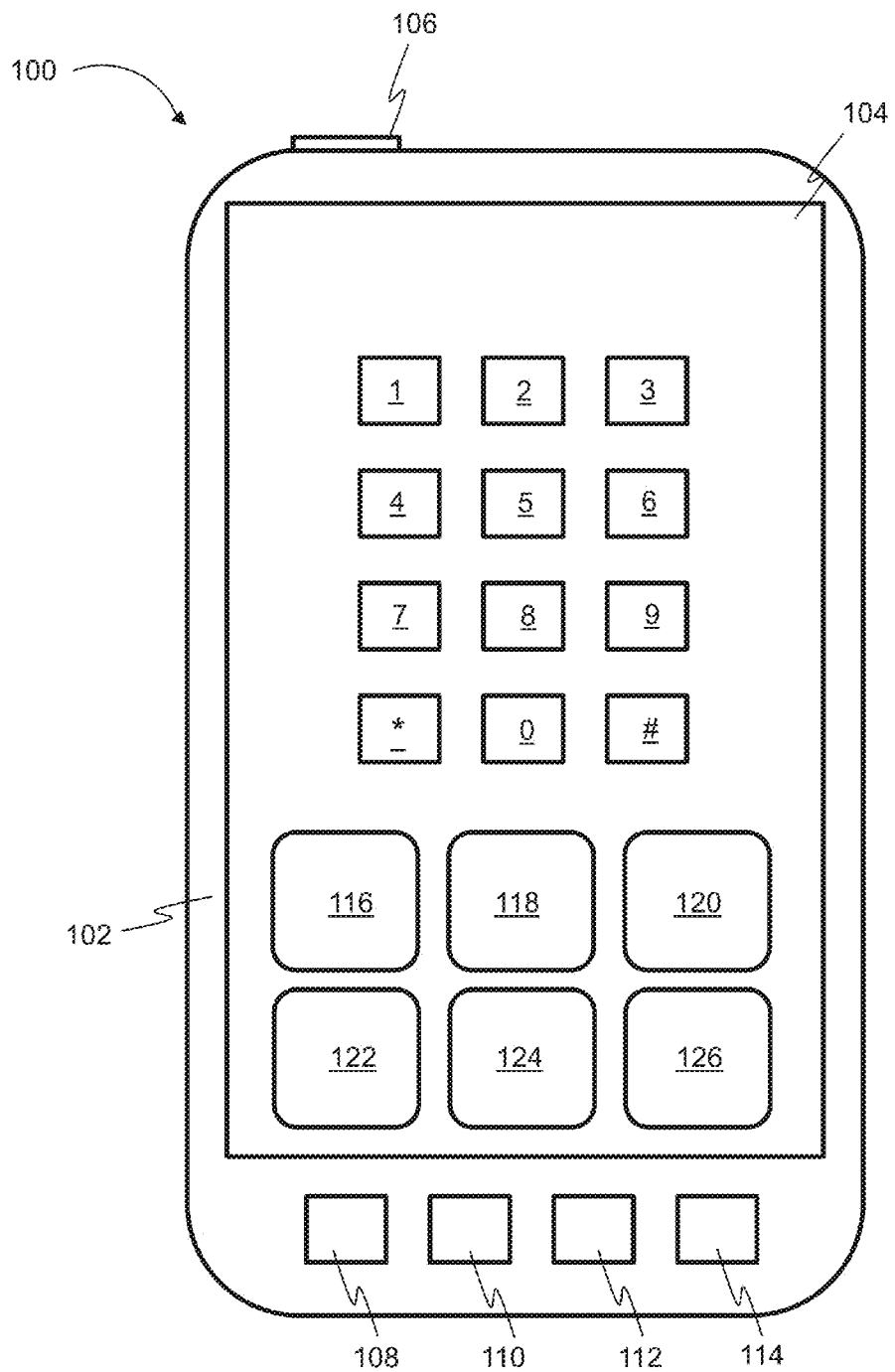
FIG. 2 shows a front view of a mobile telephony device according to embodiments.

FIG. 2 shows a front view of a mobile telephony device 100 according to embodiments. In these embodiments, the user of mobile telephony device 100 is currently conducting a call with a remote party so an in-call screen application is running on mobile telephony device 100. The in-call screen application is displaying an in-call screen on touch-screen user interface 104. The in-call screen displayed on touch-screen user interface 104 includes a number of soft-keys which are responsive to user touches to provide input to the in-call screen application running on mobile telephony device 100. The soft-keys include dial-pad digits 1, 2, . . . to 0 and the * ('star') and # ('hash') symbols which are used for entering telephone dialing numbers. The soft-keys also include several other soft-keys 116, 118, 120, 122, 124, 126 which are operable to initiate other in-call functionality in response to user input, for example end-call, call-hold, mute, speaker-phone, and show/hide dial-pad operations.

Figure 3:
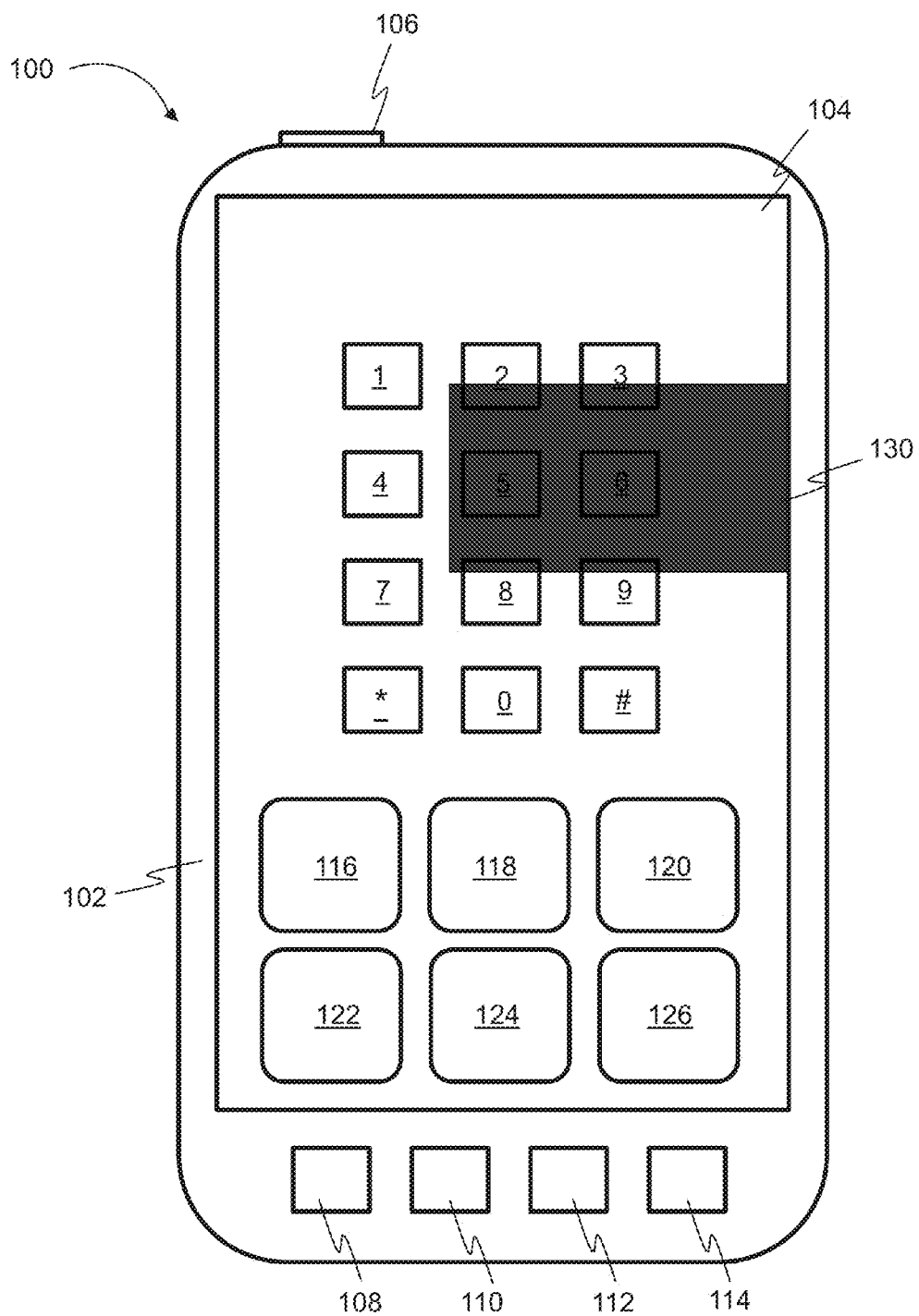
FIG. 3 shows a front view of a mobile telephony device according to embodiments.

FIG. 3 shows a front view of a mobile telephony device according to embodiments. In these embodiments, application software running on mobile telephony device 100 monitors the status of one or more applications on mobile telephony device 100 which have access to touch-screen user interface 104, (e.g. are able to send requests (or 'calls') to an Application Programming Interface (API) associated with touch-screen user interface 104). In these embodiments the monitored applications include the example predetermined in-call screen application described above in relation to FIG. 2, but in other embodiments could be any other application on mobile telephony device 100 (and similarly, the predetermined application for other embodiments described below is an in-call screen application, but could be any other application on mobile telephony device 100).

In response to the monitoring indicating that the predetermined in-call screen application is displaying (for example as the top-layer, e.g. in the foreground) a screen on the touch-screen user interface, an overlay portion 130 is displayed over a part of the screen displayed by the monitored application.

As shown in FIG. 3, overlay portion 130 is visible above the screen displayed by the in-call screen application. In these embodiments, overlay portion 130 includes a translucent layer such that the part of the screen below overlay portion 130 is partially visible through overlay portion 130. In this case, the soft-keys for digits '5' and '6' on the dial-pad part of the in-call screen can be seen through translucent overlay portion 130.

Figure 4:
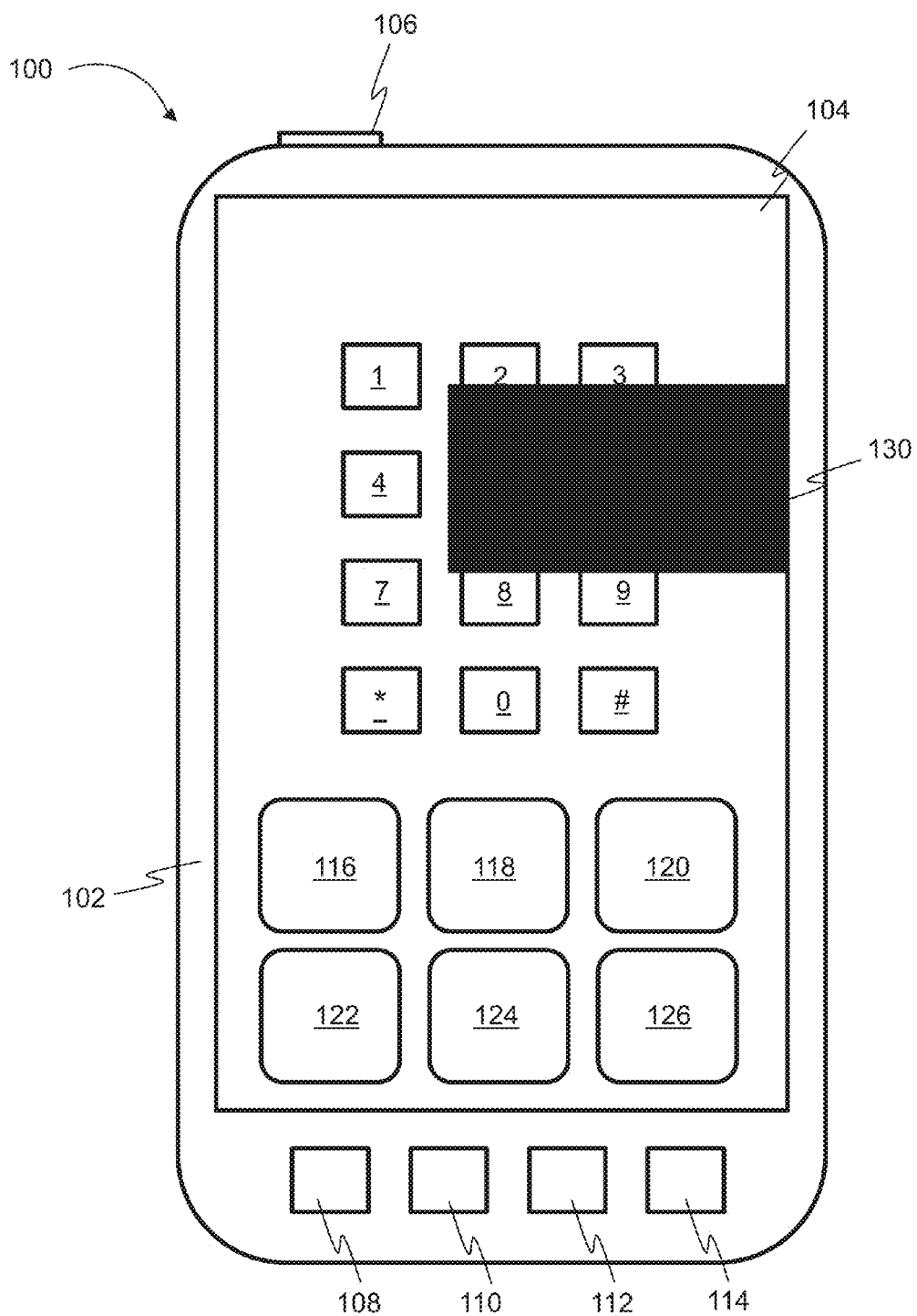
FIG. 4 shows a front view of a mobile telephony device according to embodiments.

FIG. 4 shows a front view of a mobile telephony device according to embodiments. In these embodiments, application software running on mobile telephony device 100 monitors the status of a predetermined in-call screen application running on mobile telephony device 100. In response to the monitoring indicating that the in-call screen application is displaying a screen in the foreground of the touch-screen user interface, an overlay portion 130 is displayed over a part of the screen displayed by the predetermined application. As shown in FIG. 4, overlay portion 130 is visible above the screen displayed by the in-call screen application. In these embodiments, overlay portion 130 includes an opaque layer such that the portion of the screen below overlay portion 130 is not visible through overlay portion 130. In this case, the soft-keys for digits '5' and '6' on the dial-pad part of the in-call screen cannot be seen through opaque overlay portion 130.

In alternative embodiments, an overlay comprising a mixture of translucent and opaque parts can be displayed over a part of the screen displayed by the predetermined application. In further alternative embodiments, the overlay could be displayed over the entire screen, rather than just a part of the screen.

The monitoring of the application(s) could comprise monitoring system events in the operating system of the mobile telephony device. When a given system event occurs, the status of one or more monitored applications having access to the touch-screen user interface could change thus triggering configuration of the overlap portion 130. The monitoring could comprise monitoring a list of tasks or processes running on mobile telephony device 100. Configuring of overlay portion 130 can be triggered by the predetermined application being at the top of a list of all tasks or processes running on mobile telephony device 100, or top of a list of tasks which involve or are related to screen display via the touch-screen user interface of mobile telephony device 100.

Figure 5:
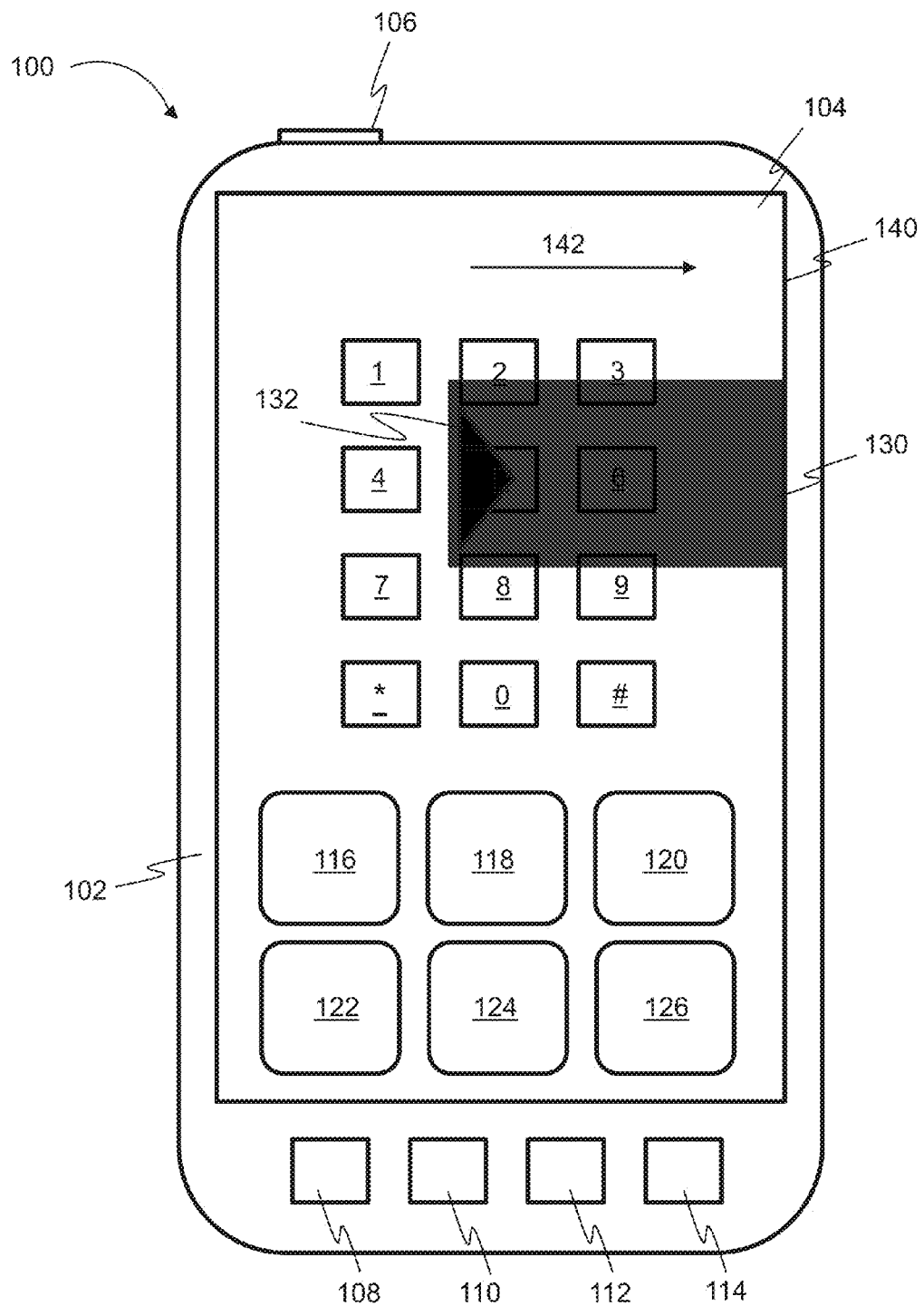
FIG. 5 shows a front view of a mobile telephony device according to embodiments.

FIG. 5 shows a front view of a mobile telephony device according to embodiments. In these embodiments, overlay portion 130 includes a touch-sensitive screen region 132 which is operable to initiate one or more operations of mobile telephony device 100 independently of the predetermined application in response to user input via touch-sensitive screen region 132. This means that user input via touch-sensitive screen region 132 will be passed to the application software of embodiments rather than to the in-call screen application displaying the in-call screen below the overlay portion, e.g. pressing touch-sensitive screen region 132 will not provide a user input of the dial-pad digit '5' to the in-call screen application, but rather will be passed to the application software of embodiments for processing.

The application software embodiments is operable to allow user input received via touch-screen user interface 104 outside overlay portion 130 to pass to the monitored application for processing. For example, if a user presses the soft-key for digit '7' which is outside overlay portion 130, then user input for the digit '7' will be passed to the monitored in-call screen application rather than being captured by the application software of embodiments.

As such, the application software of embodiments is operable to allow user input received via predefined input areas of the touch-screen user interface 104 to pass to the monitored application for processing, while the overlay portion is also active.

Figure 6:
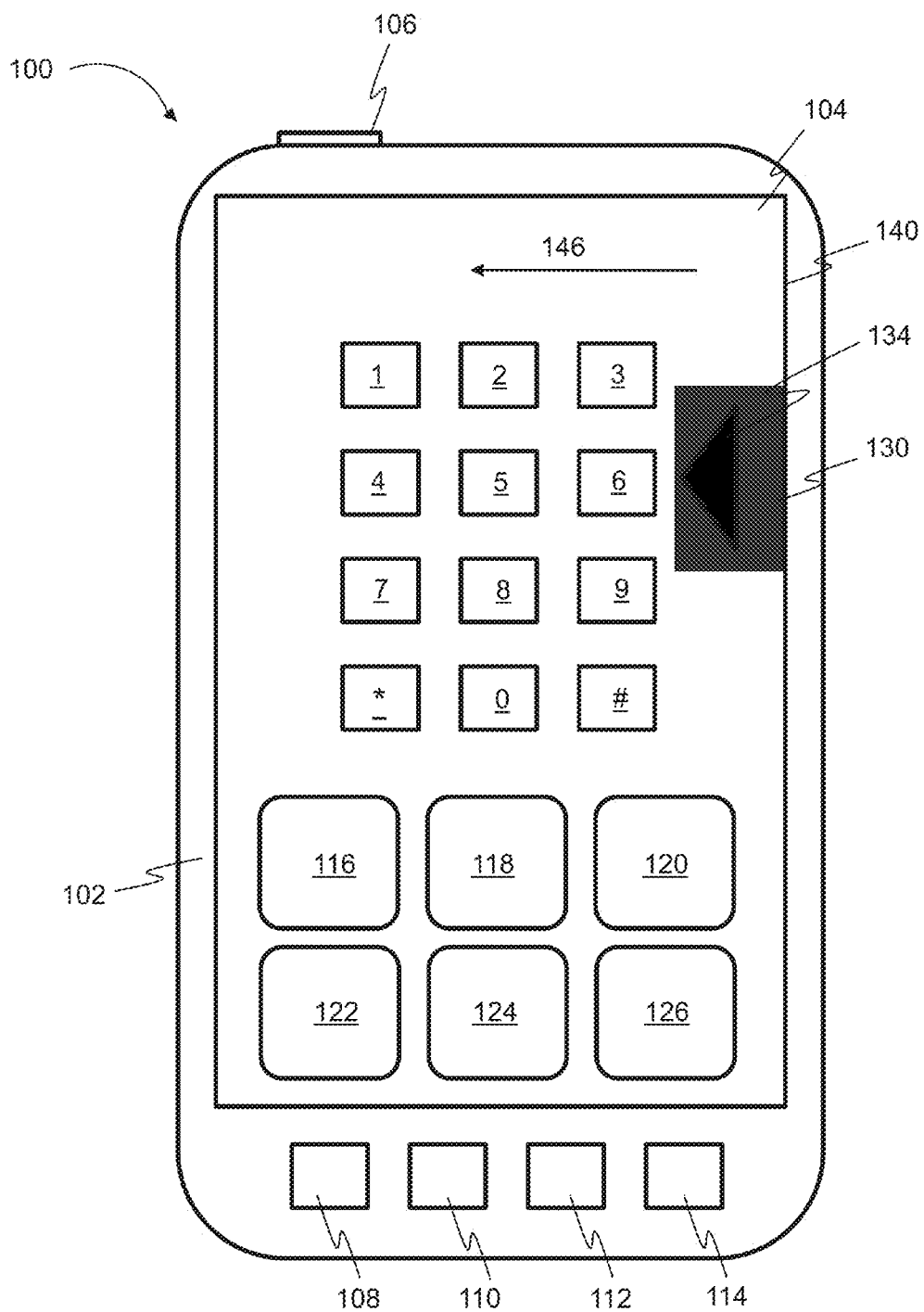
FIG. 6 shows a front view of a mobile telephony device according to embodiments.

Embodiments allow a user to vary the size of the part of the screen displayed by the predetermined application which is configured as the overlay portion in response to user input via touch-sensitive screen region 132. In one embodiment, if the user input via touch-sensitive screen region 132 includes a sliding action over the overlay portion beginning at touch-sensitive screen region 132 in a direction depicted by arrow 142 towards edge 140 of touch-screen user interface 104, the application software of embodiments is operable to reduce the size of the overlay portion in response to the sliding action, for example to produce an overlay portion as depicted in FIG. 6. Touch-sensitive screen region 132 is displayed in graphics as an arrow pointing towards edge 140 of touch-screen user interface 104 and so acts as a visual indicator to the user of mobile telephony device 100 that overlay portion may be retracted (e.g. partially hidden from view) by dragging touch-sensitive screen region 132 in the direction of the graphical arrow.

FIG. 6 shows a front view of a mobile telephony device according to embodiments. In these embodiments, overlay portion 130 includes a touch-sensitive screen region 134 which is operable to initiate one or more operations of the application software independently of the predetermined application in response to user input via touch-sensitive screen region 134.

In one embodiment, if the user input via touch-sensitive screen region 134 includes a sliding action over the overlay portion beginning at touch-sensitive screen region 134 in a direction depicted by arrow 146 away from edge 140 of touch-screen user interface 104, the application software is operable to increase the size of the overlay portion in response to the sliding action, for example to produce an overlay portion as depicted in FIG. 5. Touch-sensitive screen region 134 is displayed in graphics as an arrow pointing away from edge 140 of touch-screen user interface 104 and so acts as a visual indicator to the user of mobile telephony device 100 that overlay portion 130 may be moved into a position where more of it is visible to the user by dragging touch-sensitive screen region 134 in the direction of the graphical arrow.

Figure 7:
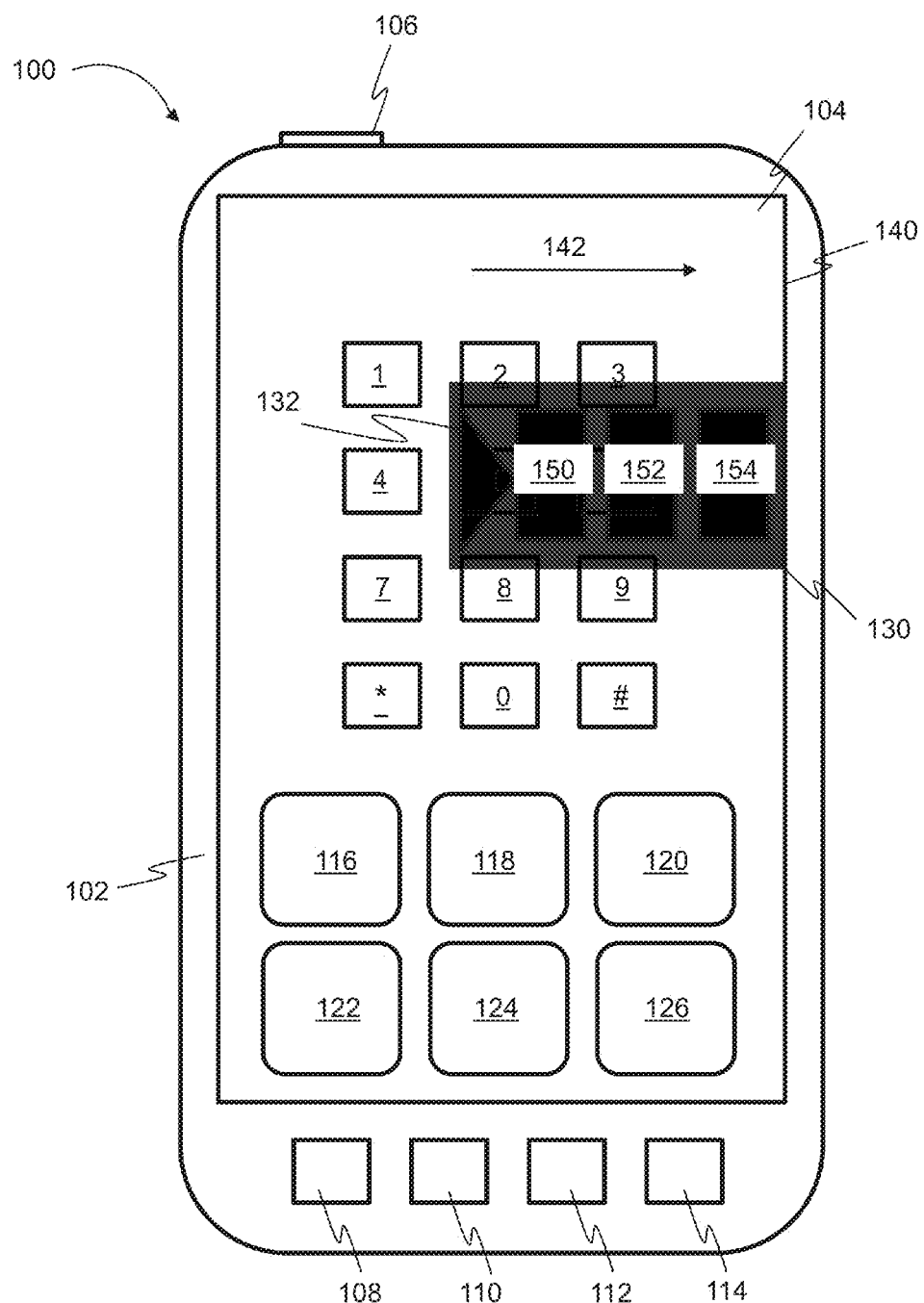
FIG. 7 shows a front view of a mobile telephony device according to embodiments.

FIG. 7 shows a front view of a mobile telephony device according to embodiments. In these embodiments, overlay portion 130 includes several touch-sensitive screen regions 132, 150, 152 and 154 which are operable to initiate one or more operations of the application software independently of the predetermined application in response to user input via touch-sensitive screen regions 132, 150, 152, 154. This means that user input via any of touch-sensitive screen regions 132, 150, 152, 154 will be passed to the application software of embodiments rather than to the predetermined in-call screen application displaying the in-call screen below the overlay portion, e.g. pressing touch-sensitive screen region 150 will not provide a user input of the dial-pad digit '5' to the in-call screen application, but rather will be passed to the application software of embodiments for processing.

Figure 8:
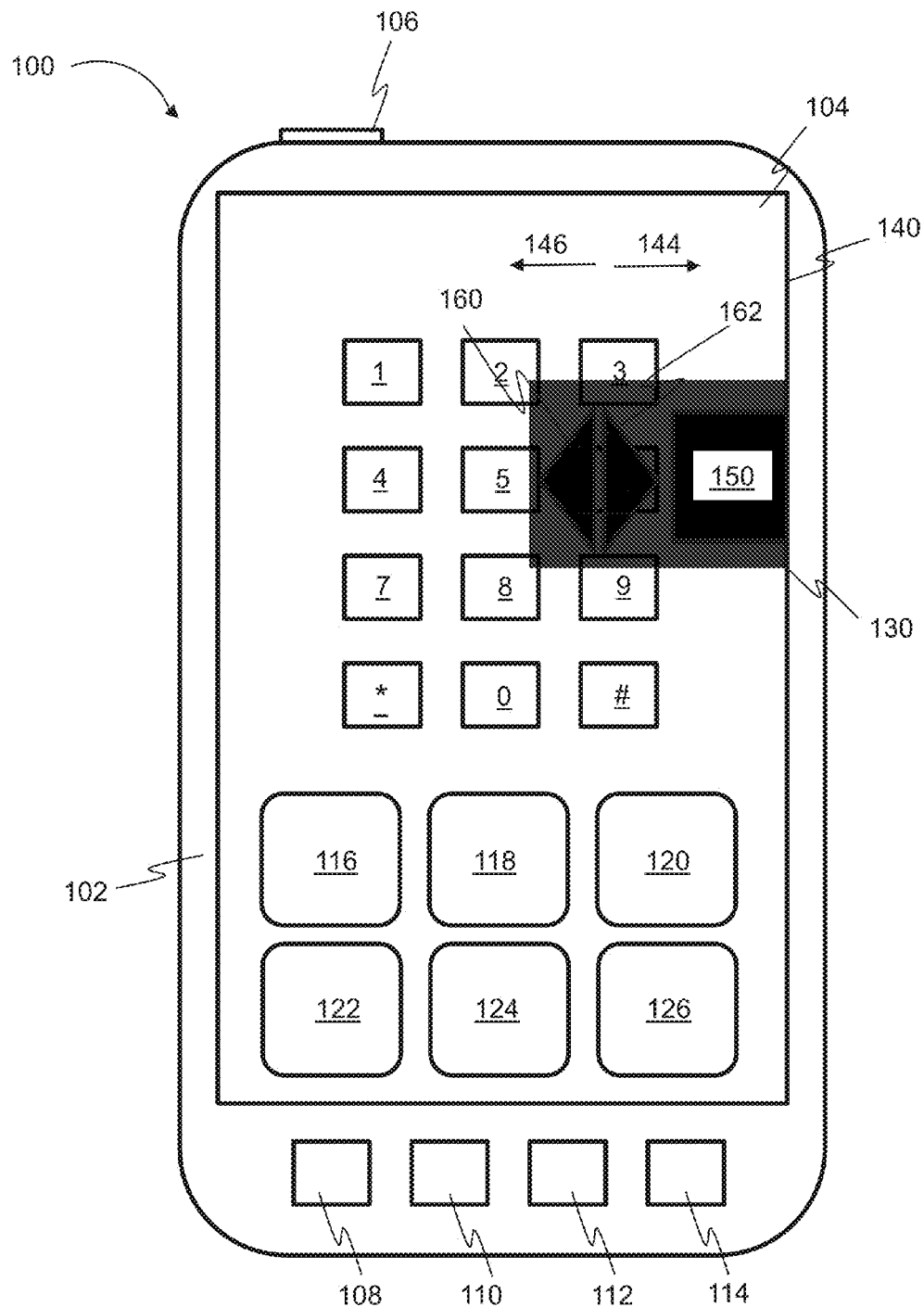
FIG. 8 shows a front view of a mobile telephony device according to embodiments.

FIG. 8 shows a front view of a mobile telephony device according to embodiments. These embodiments involve the application software being operable to vary the number of touch-sensitive screen regions within overlay portion 130. This could be carried out in conjunction with a size variation of overlay portion 130 or as a separate variation of overlay portion where its size remains the same.

In one embodiment, if the user input via touch-sensitive screen region 132 includes a sliding action over the overlay portion beginning at touch-sensitive screen region 132 in a direction depicted by arrow 142 towards edge 140 of touch-screen user interface 104, the application software is operable to decrease the number of touch-sensitive screen regions within overlay portion from the four touch-sensitive screen regions 132, 150, 152, 154 depicted in FIG. 7 to the three touch-sensitive screen regions 160, 162, 150 depicted in FIG. 8. In this case, as well as the number of touch-sensitive screen regions decreasing, the size of overlay portion 130 has decreased from that depicted in FIG. 7 to that depicted in FIG. 8.

In another embodiment, if the user input via touch-sensitive screen region 160 includes a sliding action over the overlay portion beginning at touch-sensitive screen region 160 in a direction depicted by arrow 146 away from edge 140 of touch-screen user interface 104, the application software is operable to increase the number of touch-sensitive screen regions within overlay portion 130 from the three touch-sensitive screen regions 160, 162, 150 depicted in FIG. 8 to the four touch-sensitive screen regions 132, 150, 152, 154 depicted in FIG. 7.

In a further embodiment, if the user input via touch-sensitive screen region 162 includes a sliding action over the overlay portion beginning at touch-sensitive screen region 162 in a direction depicted by arrow 144 towards edge 140 of touch-screen user interface 104, the application software is operable to decrease the number of touch-sensitive screen regions within overlay portion from the three touch-sensitive screen regions 160, 162, 150 depicted in FIG. 8 to the single touch-sensitive screen region 134 depicted in FIG. 6.

Figure 9:
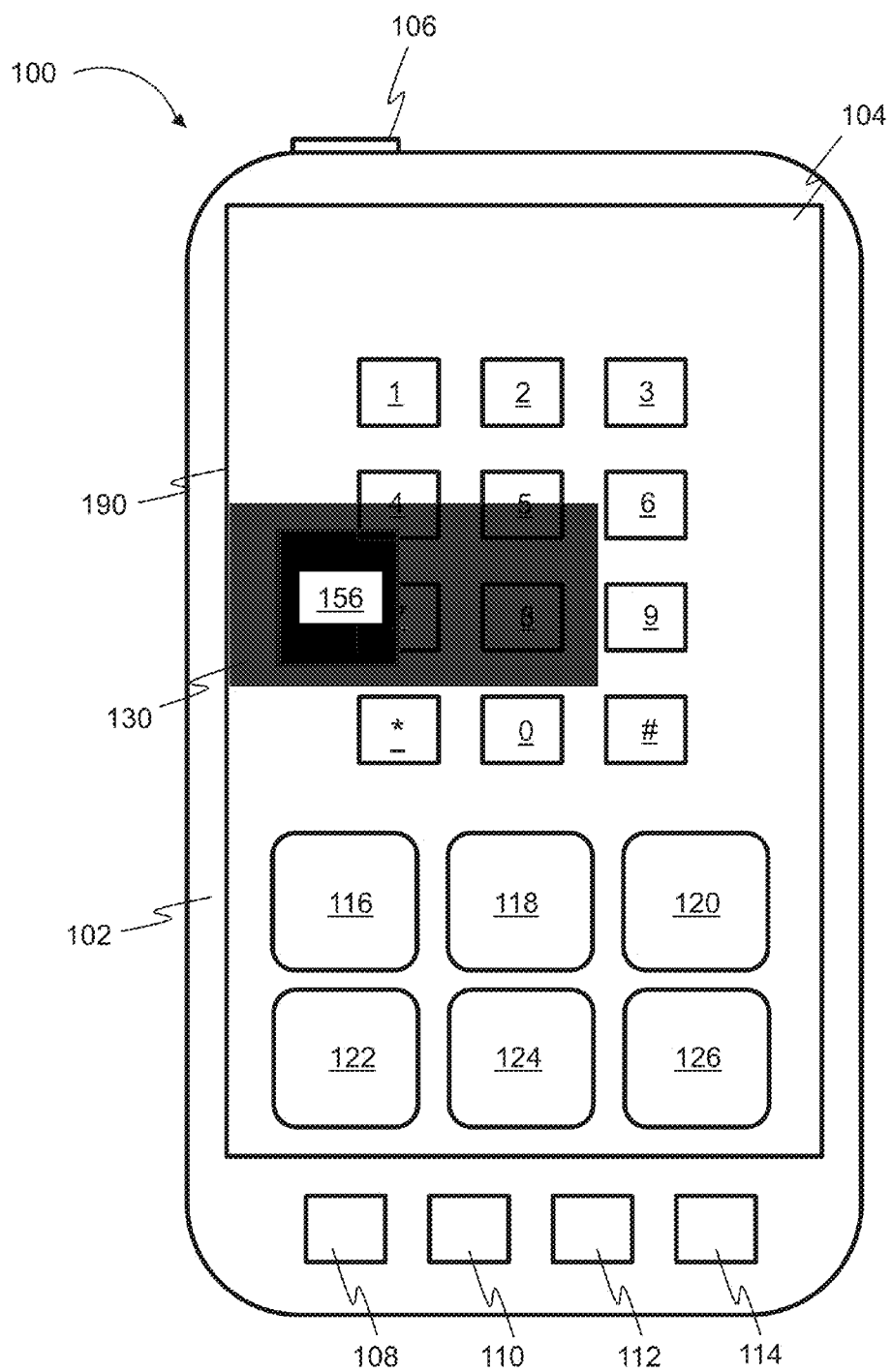
FIG. 9 shows a front view of a mobile telephony device according to embodiments.

FIG. 9 shows a front view of a mobile telephony device according to embodiments. In these embodiments, the application software is operable to vary the location of the part of the screen displayed by the predetermined application which is configured as overlay portion 130 in response to user input via one or more touch-sensitive screen regions within overlay portion 130. In this case, a user of mobile telephony device 100 may provide input to the application software by using touch-sensitive screen region 156 to drag overlay portion 130 away from its position depicted in FIG. 9 abutted against edge 190 of touch-screen user interface 104, for example to its position depicted in FIGS. 5 to 8 abutted against edge 140 of touch-screen user interface 104.

Varying the location of overlay portion 130 may require a user to press touch-sensitive screen region 156 for a number of seconds before the overlay portion becomes moveable from its current position on touch-screen user interface 104 to a different position on touch-screen user interface 104; the user may be informed that touch-sensitive screen region 156 has been pressed for long enough to activate location variation by the application software instructing activation of a vibrate function on mobile telephony device 100, or touch-sensitive screen region 156 being graphically animated in an oscillating movement or suchlike.

In the embodiments described above, the size of overlay portion 130 can be varied in response to user input in the form of a sliding action beginning at a touch-sensitive screen region within overlap portion 130. In an alternative embodiment, the size of overlay portion 130 may be altered in response to a single user touch on touch-sensitive screen region 132 with no sliding action being required. Similarly, the size of overlay portion 130 may be altered in response to a single user touch on touch-sensitive screen region 134 with no sliding action being required.

Figure 10:
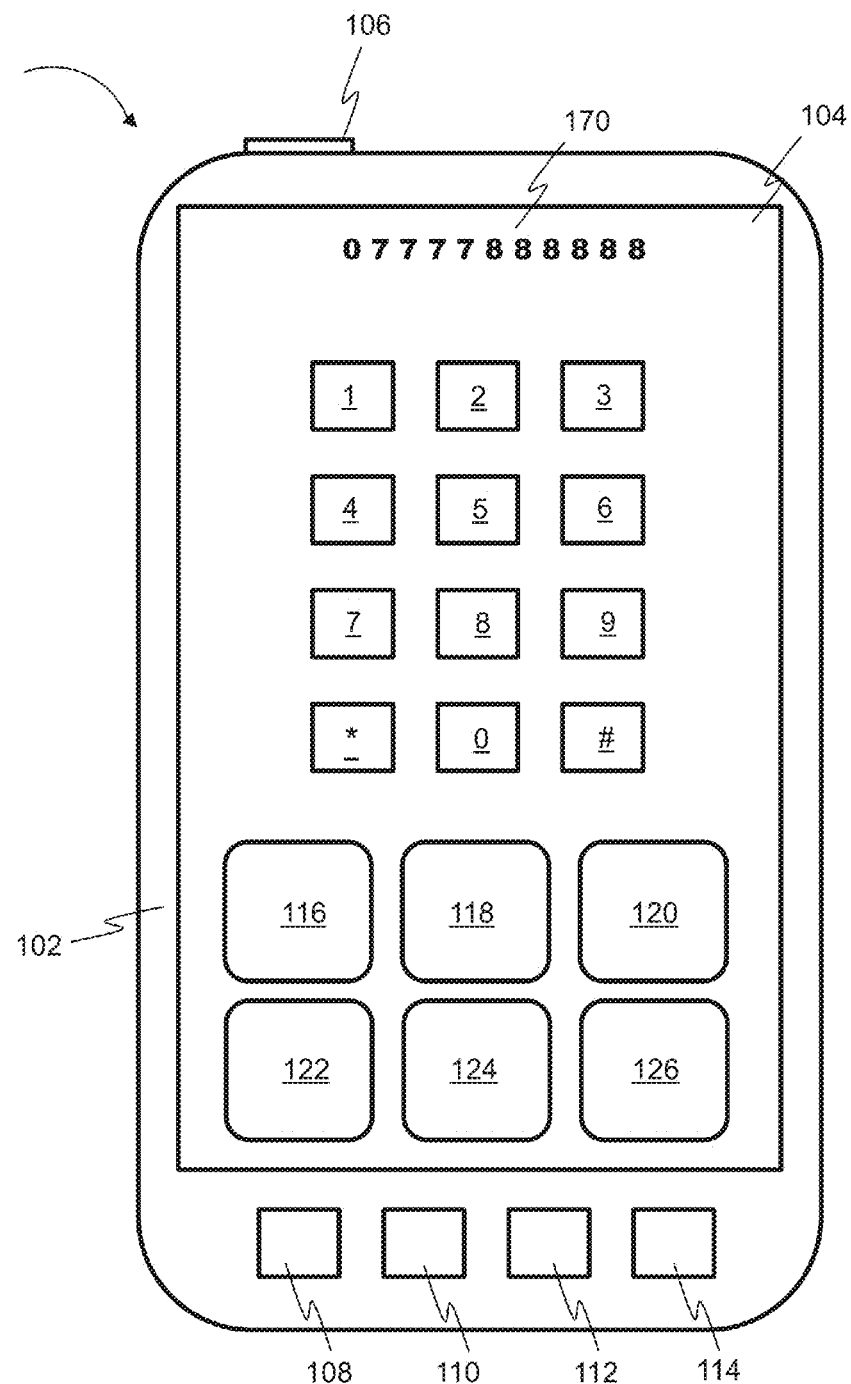
FIG. 10 shows a front view of a mobile telephony device according to embodiments.

FIG. 10 shows a front view of a mobile telephony device 100 according to embodiments. In these embodiments, the user of mobile telephony device 100 is conducting a call with a remote party so an in-call screen application is running on mobile telephony device 100. The in-call screen application is displaying an in-call screen on touch-screen user interface 104 as depicted in FIG. 10.

In these embodiments, the telephone dialing number 170 (in this example the number '07777888888') of the remote party to the call is displayed towards the top of the displayed in-call screen. The telephone dialing number 170 of the remote party may be obtained, for example, via a Calling Line Identifier (CLI) service by techniques known to one skilled in the art.

Figure 11:
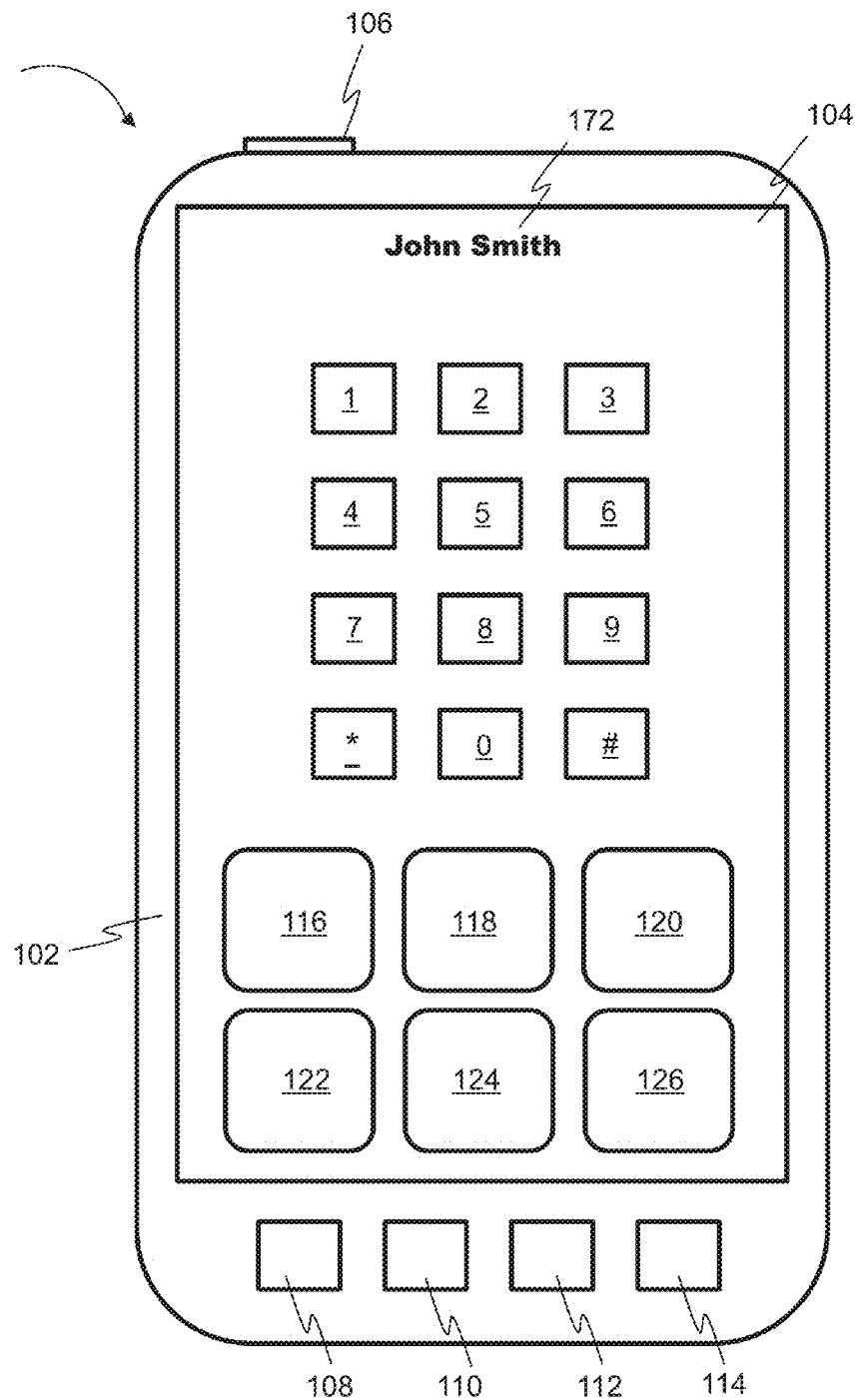
FIG. 11 shows a front view of a mobile telephony device according to embodiments.

FIG. 11 shows a front view of a mobile telephony device 100 according to embodiments. In these embodiments, application software running on mobile telephony device 100 monitors the status of a predetermined in-call screen application on mobile telephony device 100. The monitoring indicates that the predetermined in-call screen application is displaying a screen on the touch-screen user interface as shown in FIG. 10 and so an overlay portion 172 is displayed over a part of the in-call screen displayed by the predetermined application.

In this case, the overlay portion is displayed over a portion of the screen where the telephone dialing number 170 of the remote party is displayed and the overlay replaces this with the name of the remote party 172 (in this example the name 'John Smith'). The overlay portion 172 here is opaque so that although the telephone dialing number 170 is displayed within the in-call screen display, it cannot be seen through overlay portion 172. Such embodiments allow more useful information to be displayed to the user of mobile telephony device 100 during a call, in this case display of the name of a remote party rather than just the remote party's telephone dialing number.

Alternative embodiments may involve displaying the name of a remote party as an overlay in a blank portion of the displayed in-call screen, rather than overwriting existing information in the in-call screen display. Further alternative embodiments might involve overlaying other information associated with a remote call party, for example, a street address or a photo or other image, etc.

The name of the remote party may be obtained by the application software of embodiments by way of a lookup of the remote party's telephone dialing number in an address book or other contact list stored in memory on mobile telephony device 100. Alternatively, the name of the remote party may be received as data from the remote party's telephony device during the call, or obtained from a network-based lookup service which takes a telephone dialing number as an input and provides a name of a user associated with the telephone dialing number as an output.

In the embodiments described above, when the user of mobile telephony device 100 interacts with touch-screen user interface 104 within the bounds of overlay portion 130, such user input initiates one or more operations of the application software of embodiments independently of the predetermined application. However, when the user of mobile telephony device 100 interacts with touch-screen user interface 104 outside of the bounds of overlay portion 130, such user input is allowed to pass to the predetermined application, in this case an in-call screen displayed by the in-call screen application.

Embodiments described above allow for variation of the size and/or location of overlay portion 130 over the screen displayed by the predetermined application. Such overlay variation allows a user to interact with parts of the in-call screen display that were previously obscured by overlay portion 130, for example when overlay portion 130 is retracted from the position depicted in FIG. 7 to the position depicted in FIG. 6, a user can then access dial-pad digits '5' and '6' of the screen displayed by the in-call screen application.

When overlay portion 130 is varied to retract overlay portion 130, an animation of the overlay portion varying from its unvaried, larger size to its varied, smaller size is displayed within overlay portion of touch-screen user interface 104, e.g. it appears to the user that the overlay portion has been retracted.

Figure 12:
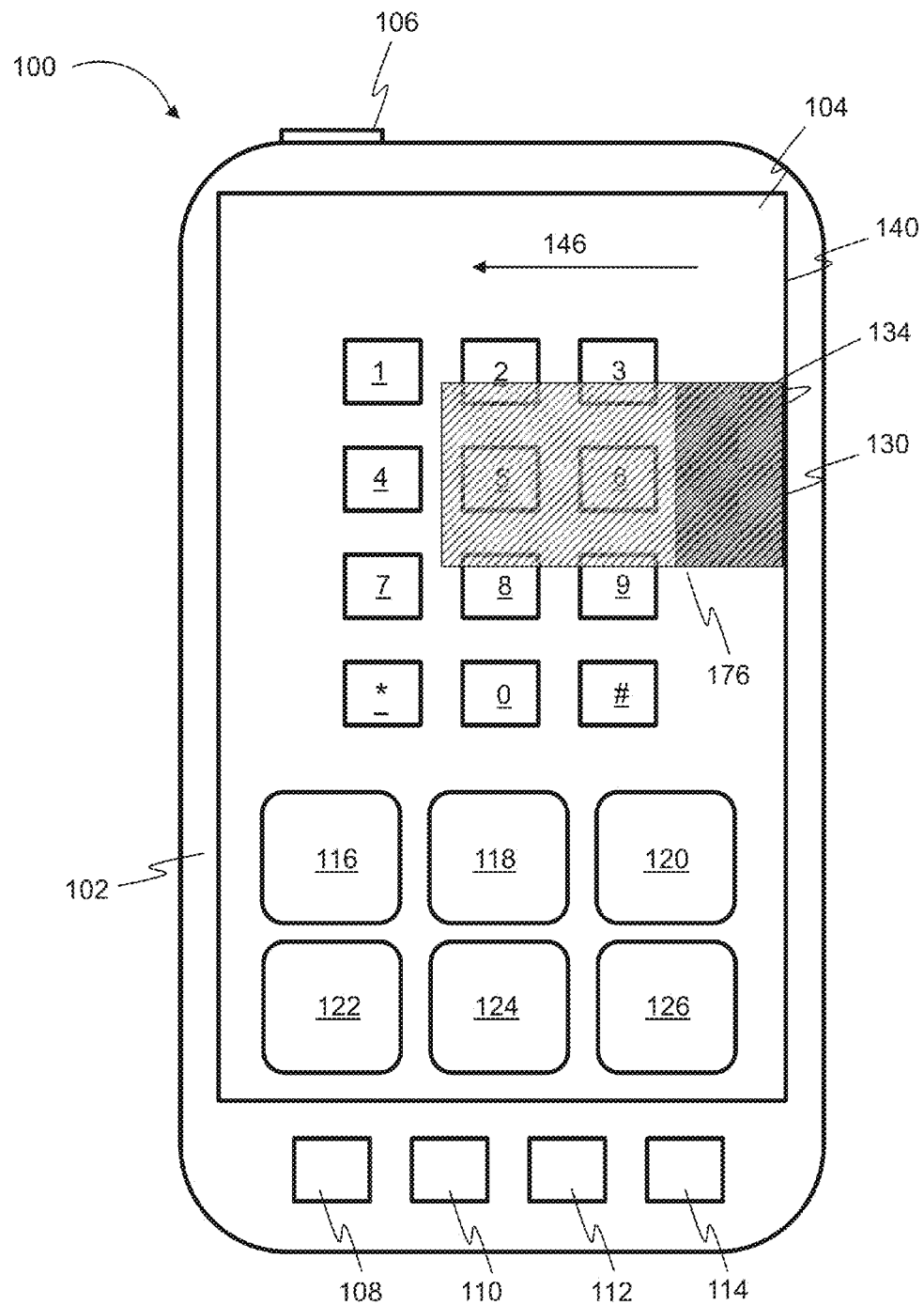
FIG. 12 shows a front view of a mobile telephony device according to embodiments.

A problem with the above approach can be that even though the user is able to see animated graphics depicting the overlay portion retracting, the part (e.g. region) of touch-screen user interface 104 occupied by overlay portion 130 has not yet changed. As it is the region of the touch-screen user interface 104 that overlay portion 130 occupies that determines which of the application software of embodiments and the in-call screen application receives the user input, this means any user input in the diagonally striped region 176 shown in FIG. 12 will be captured by the application software of embodiments and not allowed to pass to the in-call screen application. Thus, when the user tries to press the '5' or '6' digit soft-keys on the in-call screen application dial-pad, the user input will not pass to the in-call screen application as desired, instead being processed by the application software of embodiments.

Moving the region of touch-screen user interface 104 occupied by overlay portion 130 every time a user retracts the overlay portion causes the pixels that are currently drawn in overlay portion 130 to also be moved. Such pixels are re-drawn in the correct manner the next time the overlay portion is re-drawn (the next time the display of touch-screen user interface 104 refreshes). However, this does not happen instantaneously and a visual flicker (or 'blip') may be produced each time the user moves overlay portion 130; this flicker/blip may be visible to the user of mobile telephony device 100 which can detract from the user experience.

To avoid such a scenario, a two-layer overlay portion can be employed. A first layer of overlay portion 130 is configured which is responsible for receiving touch events from the user, but which is completely transparent and is thus invisible to the user. A second layer of overlay portion 130 which is not responsive to user input within the overlay portion of the touch-screen user interface is configured which depicts the requisite graphical appearance of the overlay portion including its touch-sensitive screen regions.

The transparent layer of overlay portion 130 relays touch events from the user within overlay portion 130 to the application software of embodiments which updates the visible graphics layer of overlay portion 130 accordingly. The user of mobile telephony device 100 is thus led to believe that touches within the overlay portion are being handled directly by the visible graphics layer, whilst avoiding any visible screen flicker associated with user initiated movements of the overlay portion.

FIG. 13 shows an overlay portion variation sequence according to embodiments. FIG. 13 illustrates how the two layers of the overlay portion described above function when a user retracts the overlay portion via user input within overlay portion 130.

FIG. 13A depicts overlay portion 130 before the user input begins. Overlay portion 130 includes a touch-sensitive screen region 200 in the form of a graphical arrow pointing to the right (e.g. indicating that the user may retract the overlay portion by sliding or dragging touch-sensitive screen region 200 in the direction of the graphical arrow). Overlay portion 130 is bounded by the dimensions of window 210 with both the touch-sensitive invisible layer and the visible graphics layer having the same dimensions. Here, the visible graphics layer depicts touch-sensitive screen region 200 in its initial position.

FIG. 13B depicts overlay portion 130 just after the user has begun to retract overlay portion 130 to the right with a sliding action beginning at touch-sensitive screen region 200. Here, the visible graphics layer depicts touch-sensitive screen region 202 in a position further to the right than touch-sensitive screen region 200 depicted in FIG. 13A. Overlay portion 130 is still bounded by the dimensions of window 210 with both the touch-sensitive invisible layer and the visible graphics layer having the same dimensions as in FIG. 13A.

The dimensions of the visible graphics layer are then redefined to those of the overlay portion in its varied state, e.g. the visible graphical overlay portion is reconfigured as per window 212 in FIG. 13C. Once the visible graphics layer has been redefined, the dimensions of the invisible touch-sensitive layer are redefined to those of the overlay portion in its varied state, e.g. the invisible touch-sensitive overlay portion is reconfigured as per window 212 in FIG. 13C.

FIG. 13D depicts overlay portion 130 later on in the process of the user dragging the overlay portion to the right with a sliding action beginning at touch-sensitive screen region 200 and continuing with touch-sensitive screen region 202. Here, the visible graphics layer depicts touch-sensitive screen region 204 in a position further to the right than touch-sensitive screen region 202 depicted in FIG. 13C. Overlay portion is bounded by the dimensions of window 212 with both the touch-sensitive invisible layer and the visible graphics layer having the same dimensions as in FIG. 13C.

The dimensions of the visible graphics layer are then redefined to those of the overlay portion in its varied state, e.g. the visible graphical overlay portion is reconfigured as per window 214 in FIG. 13E. Once the visible graphics layer has been redefined, the dimensions of the invisible touch-sensitive layer are redefined to those of the overlay portion in its varied state, e.g. the invisible touch-sensitive overlay portion is reconfigured as per window 214 in FIG. 13E.

Figure 13F:
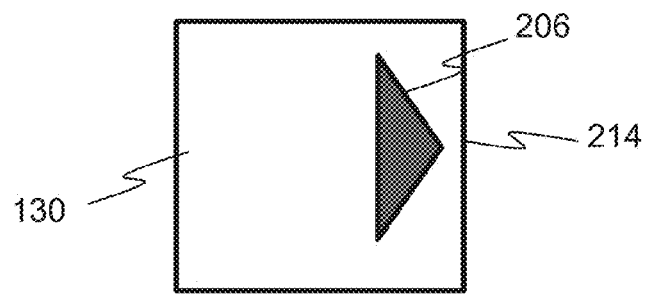

FIG. 13F depicts overlay portion 130 later on in the process of the user dragging the overlay portion to the right with a sliding action beginning at touch-sensitive screen region 200 and continuing with touch-sensitive screen region 202 then touch-sensitive screen region 204. Here, the visible graphics layer depicts touch-sensitive screen region 206 in a position further to the right than touch-sensitive screen region 204 depicted in FIG. 13E. Overlay portion 130 is bounded by the dimensions of window 214 with both the touch-sensitive invisible layer and the visible graphics layer having the same dimensions as in FIG. 13E.

Figure 13G:
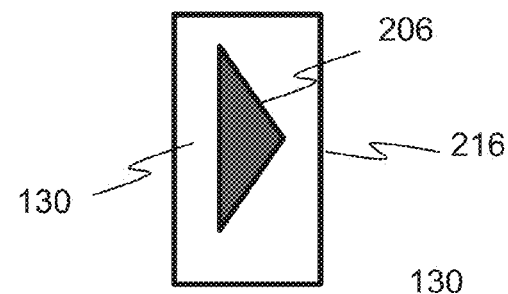

The dimensions of the visible graphics layer are then redefined to those of the overlay portion in its varied state, e.g. the visible graphical overlay portion is reconfigured as per window 216 in FIG. 13G. Once the visible graphics layer has been redefined, the dimensions of the invisible touch-sensitive layer are redefined to those of the overlay portion in its varied state, e.g. the invisible touch-sensitive overlay portion is reconfigured as per window 216 in FIG. 13G.

Figure 13H:
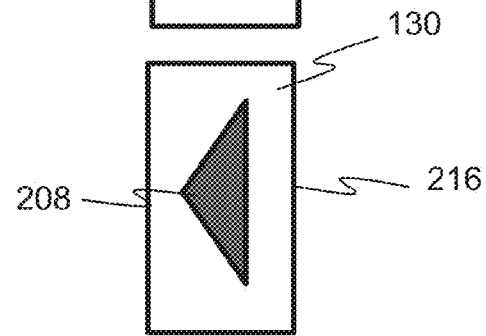

FIG. 13H depicts overlay portion 130 at the end of the user dragging the overlay portion to the right with a sliding action beginning at touch-sensitive screen region 200 and continuing with touch-sensitive screen region 202, then touch-sensitive screen region 204, and then touch-sensitive screen region 206. In this case, the visible graphics layer depicts a touch-sensitive screen region 208 in the form of a graphical arrow pointing to the left (e.g. indicating that the user may enlarge the overlay portion by dragging touch-sensitive screen region 200 in the direction of the graphical arrow). Overlay portion 130 is bounded by the dimensions of window 216 with both the invisible touch-sensitive layer and the visible graphics layer having the same dimensions as in FIG. 13G.

Once the dimensions of the invisible touch-sensitive layer have been reduced from those of window 210 to those of window 216, only user input within window 216 will be processed by the application software of embodiments. User input outside window 216 will pass to the in-call screen as desired, for example allowing digits '5' and '6' of the in-call screen display to be accessed by the user.

In terms of the order of events depicted in FIG. 13, an animation of the overlay portion varying from its unvaried size to its varied size is displayed via the visible graphics layer as per FIGS. 13A to 13B. The dimensions of the visible graphics layer are then redefined to those of the overlay portion in its varied state, e.g. the visible graphical overlay portion is reconfigured as per window 212 in FIG. 13C. Once the visible graphics layer has been redefined, the dimensions of the invisible touch-sensitive layer are redefined to those of the overlay portion in its varied state, e.g. the invisible touch-sensitive overlay portion is reconfigured as per window 212 in FIG. 13C. Events are similarly ordered for the further variation of overlay portion 130 in FIGS. 13C to 13E and in FIGS. 13E to 13G. The overlay portion variation of FIG. 13G to FIG. 13H only involves depiction of touch-sensitive screen region 206 changing from being an arrow pointing to the right to touch-sensitive screen region 208 being an arrow pointing to the left with no change in the dimensions of the visible graphics layer or the invisible touch-sensitive layer.

The processes described above in relation to FIGS. 12 and 13 for reducing the size of, e.g. retracting, the overlay portion can be reversed for increasing the size of the overlay portion over the screen displayed by the predetermined application. Similar techniques can be used for varying the location of the overlay portion over the screen displayed by the predetermined application.

Embodiments of described above involve configuring one or more touch-sensitive screen regions in overlay portion 130 which are operable to initiate one or more operations of the application software of embodiments independently of the predetermined application in response to user input via the one or more touch-sensitive screen regions.

In some embodiments, an application software operation initiated via a touch-sensitive screen region of overlay portion 130 may comprise transmitting a command or instruction to a different software application, other than the application software of embodiments, installed and/or running on mobile telephony device 100. For example, a command could be sent to open a different software application such as a camera application, a mapping application, a file browsing application, or an address book application.

In alternative embodiments, the application software is operable to allow user input received via touch-screen user interface 104 within overlay portion 130 to pass to the predetermined application for processing. In such embodiments, overlay portion 130 is visible to a user of mobile telephony device 100, but touches by the user within overlay portion 130 will not initiate any operations within the software application of embodiments. In further alternative embodiments, the overlay portion could comprise a mixture of touch-sensitive portions and non touch-sensitive portions whereby user input in the former is processed by the application software of embodiments and user input in the latter is passed to the predetermined application displaying the screen below the overlay portion for processing.

In embodiments, the application software is operable to remove the display of overlay portion 130 over the screen displayed by the predetermined application in response to the monitoring indicating that the predetermined application has ceased to display the screen on touch-screen user interface 104. For example, if the user of mobile telephony device 100 wishes to use a different function (or application) other than one provided by the predetermined application being monitored by the application software of embodiments, then when the user navigates away from the predetermined application using appropriate input on mobile telephony device 100, then overlay portion 130 is no longer overlaid over the screen displayed by the different function. If the user then navigates back to the predetermined application once more, then overlay portion 130 can be also be configured once more over a screen displayed by the predetermined application.

In alternative embodiments, overlay portion 130 remains when the monitored application no longer displays a screen itself, e.g. overlay portion 130 is overlaid over screens subsequently displayed by applications other than the monitored application.

Embodiments involve computing device 100 comprising a mobile telephony device 100 and the predetermined application being an in-call screen application which displays an in-call screen to the user of mobile telephony device 100 when the user is conducting a call using mobile telephony device 100 with a remote telephony device (not shown). Such a call will typically be a circuit-switched voice call, the set-up and control for which is known in the art.

In certain embodiments, application software running on mobile telephony device 100 may request that the mobile operating system notify the application software of the start and end of the call. This could, for example, involve registering with an application programming interface (API) associated with these events. In one embodiment, the operating system sends a message to the application software to indicate the start of the call event, and sends another message to the application software to indicate the end of the call event. Other notification mechanisms are also contemplated, such as semaphores, etc.

In other embodiments, application software running on mobile telephony device 100 detects that there is a call in progress between mobile telephony device 100 and the remote telephony device, and notifies a server (not shown) of call party details for the call, e.g. the telephone dialing numbers (TDNs) of telephones involved in the call. Similarly, application software running on the remote telephony device detects the call in progress and also notifies the server of call party details for the call. The user of mobile telephony device 100 could be the calling or the called party for the call.

The server identifies that the call notification from mobile telephony device 100 and call notification from the remote telephony device have call party details in common and establishes a separate communications session, separate from the telephone call, for the communication of data between mobile telephony device 100 and the remote telephony device. The separate communications session is established on the basis of the received call party details. The separate communications session is established whilst the telephone call is in progress, and is continued in parallel with the telephone call, such that voice call data is transmitted via the telephone call and other data may be transmitted via the communications session, after the establishment of the separate communications session.

When the server receives data from mobile telephony device 100 via the separate communication session, the server identifies that a communications session has been established between mobile telephony device 100 and the remote telephony device and transmits the data received from mobile telephony device 100 to the remote telephony device. A similar process can be used by the user of the remote telephony device to send data to mobile telephony device 100.

In embodiments described above, configuration of overlay portion 130 is triggered when monitoring of a predetermined in-call screen application indicates that an in-call screen application on mobile telephony device 100 is displaying a screen on mobile telephony device 100.

In embodiments, establishment of a separate communications session between mobile telephony device 100 and the remote telephony device can also be triggered by the monitoring of the predetermined in-call screen application indicating that an in-call screen application on mobile telephony device 100 is displaying a screen on mobile telephony device 100. In such embodiments, configuration of overlay portion 130 can be triggered when monitoring of a predetermined application associated with establishment of a separate communications session indicates that a separate communications session has been established between mobile telephony device 100 and the remote telephone, e.g. when a call starts, an in-call screen application displays in in-call screen which triggers establishment of a separate communications session, which in turn triggers configuration of the overlay portion.

In such embodiments, overlay portion 130 can be employed to control transmission of data via the separate communications session established between mobile telephony device 100 and the remote telephony device. In particular, the one or more touch-sensitive screen regions which are operable to initiate one or more operations of the computing device independently of the predetermined in-call screen application in response to user input via the one or more touch-sensitive screen regions can be used to initiate transmittal of data via the separate communications session. The overlay portion of embodiments thus allows a user of mobile telephony device 100 to conveniently transmit data to the remote telephony device without the user having to navigate to/from the screen displayed by the in-call screen application.

Figure 14:
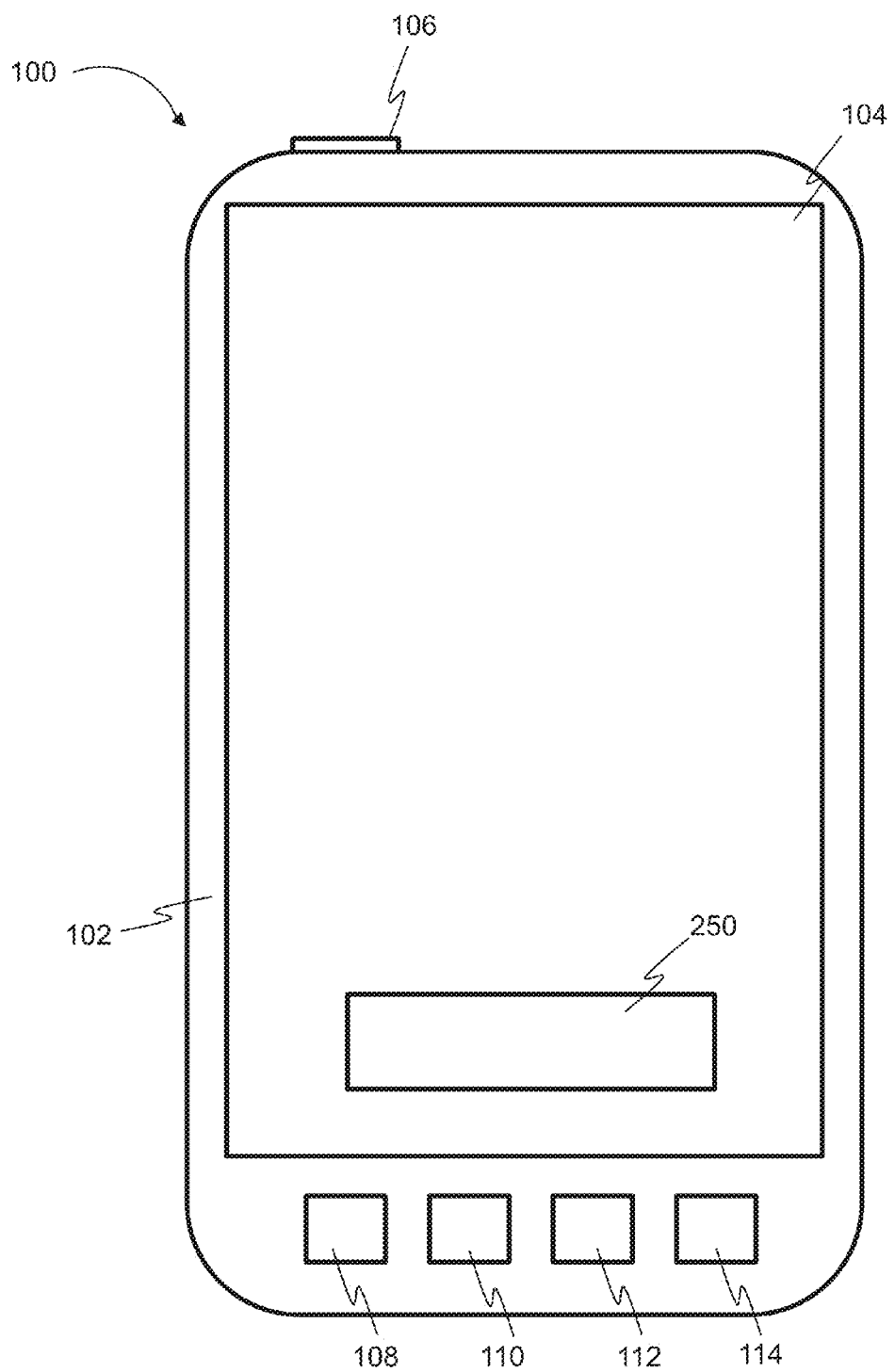
FIG. 14 shows a front view of a mobile telephony device according to an embodiment.

If the user of mobile telephony device 100 wants to communicate data to (e.g. share data with) the remote telephony device, the user presses the touch-screen user interface in an appropriate place on the overlay portion to activate one of the touch-sensitive screen regions. Such user input can comprise an instruction to open up another application on mobile telephony device 100, for example a camera, mapping, geolocation, file browsing, address book application, etc., through which the user can capture or select data for transmittal via the separate communications session. The data can then be conveniently transmitted via the separate communications session by further appropriate user input on the touch-screen user interface, such as, for example, selecting a confirmation soft key that is displayed to the user after the data has been captured or selected by the application. FIG. 14 depicts a confirmation soft key 250 that is presented to the user after the data has been captured or selected.

The data communicated via the separate communication session may comprise receiving data, such as, for example, a photographic image data file, a word processing document data file, a spreadsheet document data file, a presentation document data file, a video image data file, streaming video, etc., from one of mobile telephony device 100 and the remote telephony device, during the separate communications session, and transmitting the data to the other of mobile telephony device 100 and the remote telephony device.

The communication session between the mobile telephony device 100 and the remote telephony device is hosted by either the cellular network (e.g., GSM, LTE, etc.) or another wireless network (e.g., WiFi, Bluetooth, etc.). In certain embodiments, this connection creates a channel directly between the mobile telephony device 100 and the remote telephony device through which data can be communicated in either direction. In these embodiments, a server is not required.

In other embodiments, the communication session is established in the form of a client-server relationship, with the server acting as the server and each of mobile telephony device 100 and the remote telephony device acting as clients. One connection is created between the server and mobile telephony device 100 and another connection is created between the server and the remote telephony device. The two connections together create a channel between mobile telephony device 100 and the remote telephony device through which data can be communicated in either direction.

In these embodiments, the server establishes client-server connections with mobile telephony device 100 and the remote telephony device in response to receiving one or more client-server connection requests. In these embodiments, a client-server connection request is transmitted in response to the telephone call being established between mobile telephony device 100 and the remote telephony device. In other embodiments, a client-server connection request is transmitted in response to initiation of a data communications service on mobile telephony device 100 or the remote telephony device after the telephone call is established between them. The connections may use various well-known data transfer protocols, such as, for example, HyperText Transfer Protocol (HTTP), HyperText Transfer Protocol Secure (HTTPS), File Transfer Protocol (FTP), UDP-based Data Transfer Protocol (UDT), etc. Alternatively, a proprietary data transfer protocol may be employed.

To avoid loss of the channel between mobile telephony device 100 and the remote telephony device, the connections can be maintained by maintenance messages ('heartbeats') transmitted from the server to mobile telephony device 100 and the remote telephony device, for example transmitted at periodic intervals sufficiently short to prevent time-out of the connections due to inactivity, for example, a client-server connection can be maintained by transmitting a message to keep the connection alive if the telephone call lasts more than a connection threshold period.

In embodiments, the communications session between mobile telephony device 100 and the remote telephony device can be maintained after the voice call is terminated allowing the users of mobile telephony device 100 and the remote telephony device to continue communicating data between their user devices.

In alternative embodiments, the separate communications session is established via the server and data is transmitted via a data communication path between mobile telephony device 100 and the remote telephony device which is established on the basis of information received from the server, but with the server not being including in the data communication path.

As explained above in relation to FIG. 3, the monitored application can be the example in-call screen application described above in relation to FIG. 2. In other embodiments, the monitored application could also be any other application on mobile telephony device 100. For example, in some embodiments, the computing devices to which these embodiments could be applied do not have telephony capabilities.

In the embodiments described below in relation to FIGS. 15 to 19, an example scenario is described in which the user of mobile telephony device 100 is using a media player application on the mobile telephony device 100 to play a media file. However, the user of the mobile telephony device 100 could be using any other application on the mobile telephony device 100 (including the in-call screen application).

Figure 15:
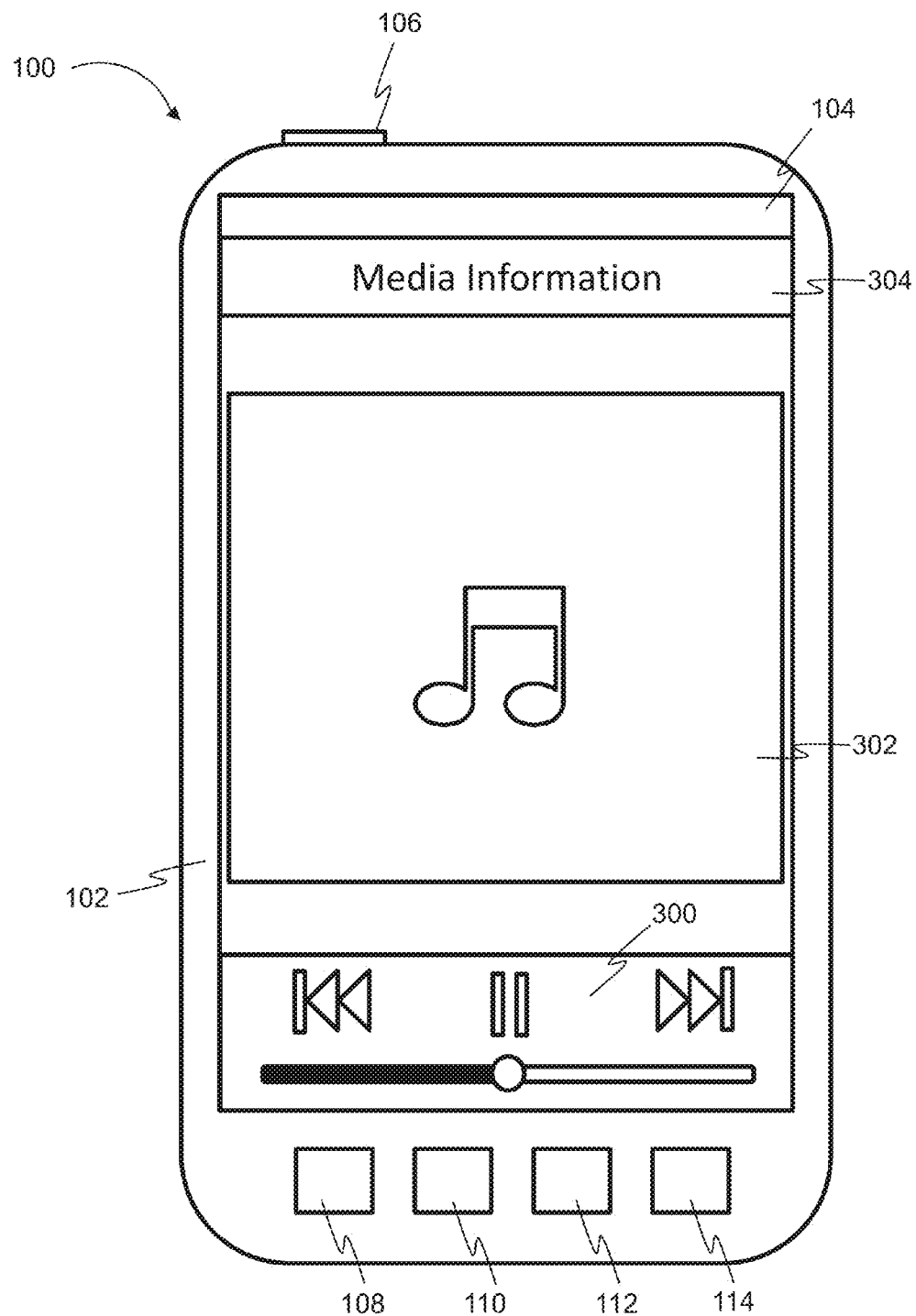
FIG. 15 shows a front view of a mobile telephony device according to an embodiment.

FIG. 15 shows a front view of a mobile telephony device 100 according to embodiments. In the example below, the user of mobile telephony device 100 is currently using the media player application on telephony device 100 to play a music media file. The media player application is displaying a media player screen on a touch-screen user interface 104.

The media player screen displayed on touch-screen user interface 104 includes a number of soft-keys 300 for music media playback control which are responsive to user touches to provide input to the media player application running on mobile telephony device 100. The soft-keys provide respective skip to previous (or start of) music media, pause music media, skip to next music media and volume control functionality for controlling media playback on mobile telephony device 100.

The media player screen displayed on touch-screen user interface 104 also includes a display region 302 for displaying graphical content associated with the music media file. The graphical content associated with the music media file may comprise album artwork graphics, if available, or default graphical content if no such album artwork graphics is available. The media player screen displayed on touch-screen user interface 104 also includes a display region 304 for displaying media information pertaining to the music media file. The media information pertaining to the music media file may comprise a track, album and artist title.

Figure 16:
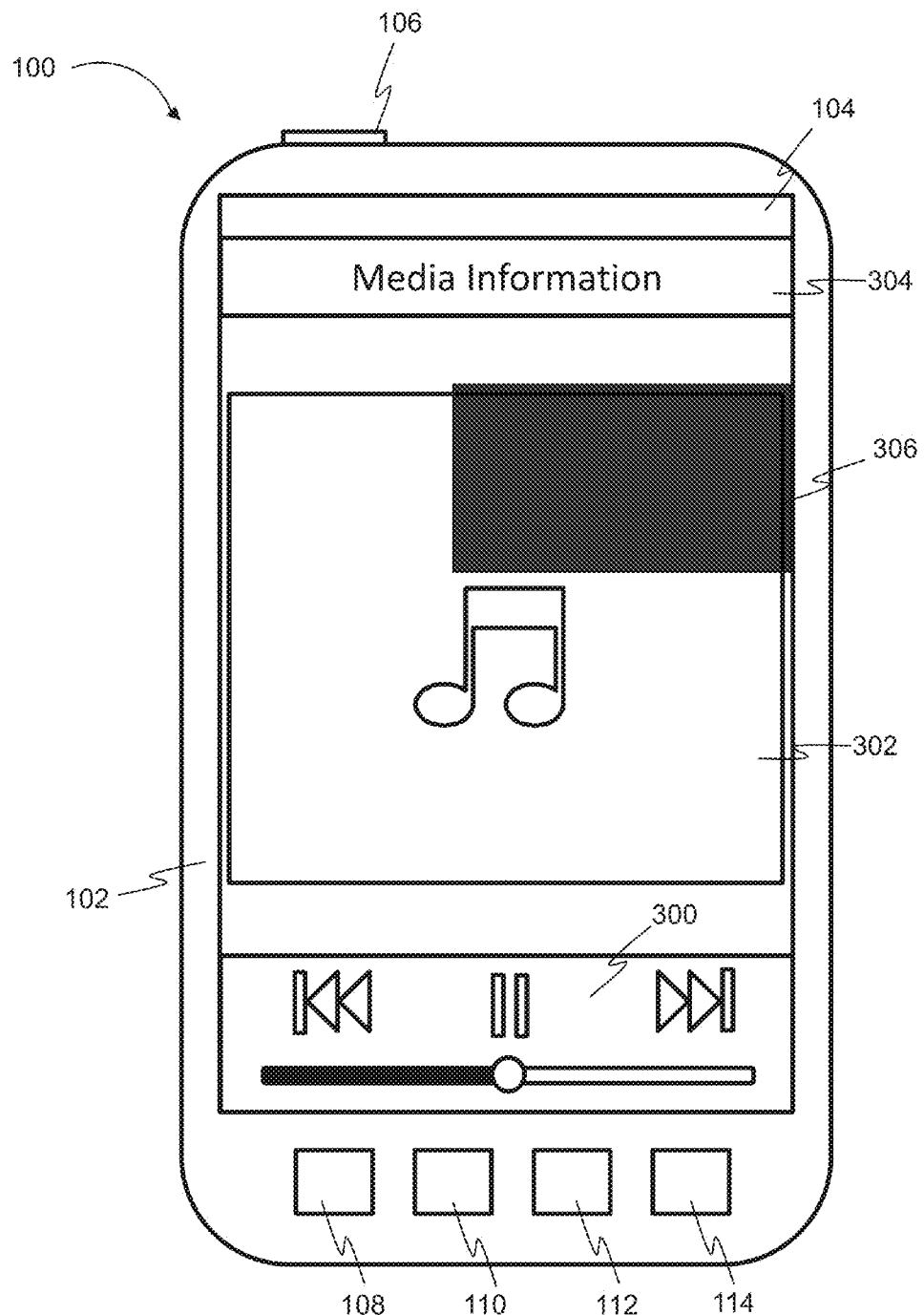
FIG. 16 shows a front view of a mobile telephony device according to an embodiment.

FIG. 16 shows a front view of a mobile telephony device according to embodiments. In these embodiments, application software running on mobile telephony device 100 monitors the status of one or more applications on mobile telephony device 100 which have access to touch-screen user interface 104, (e.g. are able to send requests (or 'calls') to an Application Programming Interface (API) associated with touch-screen user interface 104). In these embodiments the monitored applications include the media player application described above in relation to FIG. 15, but in other embodiments could be any other application on mobile telephony device 100 (including the in-call display application).

In response to the monitoring indicating that the media player application is displaying (for example as the top-layer, e.g. in the foreground) a screen on the touch-screen user interface, an overlay portion 306 is displayed over a part of the screen displayed by the monitored application. As shown in FIG. 16, overlay portion 306 is visible above the screen displayed by the media player application.

In some embodiments, overlay portion 306 includes a translucent graphical overlay portion that is visible above the part of the screen displayed by the media player application that it covers. In this case, the graphical content associated with the music media file displayed on the display region 302 below the translucent graphical overlay portion 306 can be seen through translucent graphical overlay portion 306.

In other embodiments, the overlay portion 306 includes an opaque graphical overlay portion that is visible above the part of the screen displayed by the media player application that it covers. In this case, the graphical content associated with the music media file displayed on the display region 302 below the opaque graphical overlay portion 306 cannot be seen through opaque graphical overlay portion 306.

Figure 17:
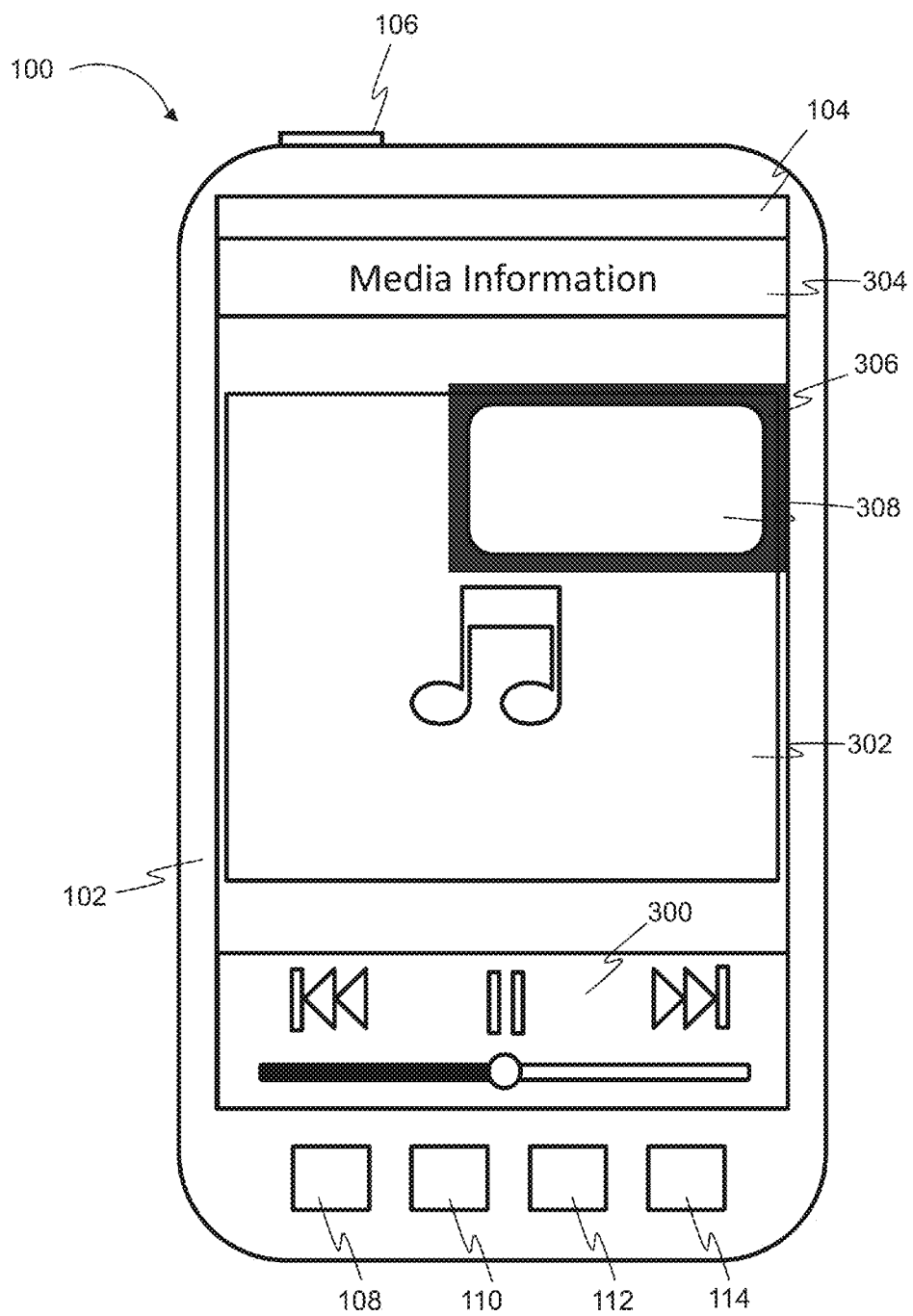
FIG. 17 shows a front view of a mobile telephony device according to an embodiment.

FIG. 17 shows a front view of a mobile telephony device according to embodiments.

In some embodiments, the overlay portion 306 includes an opaque and/or translucent graphical overlay portion 308 for displaying graphical content, as discussed above. In such embodiments, the overlay portion 306 may not comprise any touch-sensitive screen regions. In embodiments such as these, the graphical overlay portion 308 may display in graphics non touch-interactive advertisement graphics. The advertisement graphics may, for example, comprise a (non touch-interactive) company name or logo.

In some embodiments, the graphical content may be provided by a content provider that has access to a content store. The graphical content may be reconfigured, for example after graphical content has been displayed for a predetermined amount of time or in response to predefined user input.

In some embodiments, the content provided by the content provider may be targeted, or context-based, content. For example, the content may be targeted based on application being monitored and/or the geographical location of the mobile telephony device. In such an example, the application software of embodiments may identify the application being monitored to a content server which may provide targeted content, such as a targeted advertisement based on the application being monitored. For example, if the application being monitored is a media player application, the targeted advertisement may comprise a media file download store logo.

Figure 18:
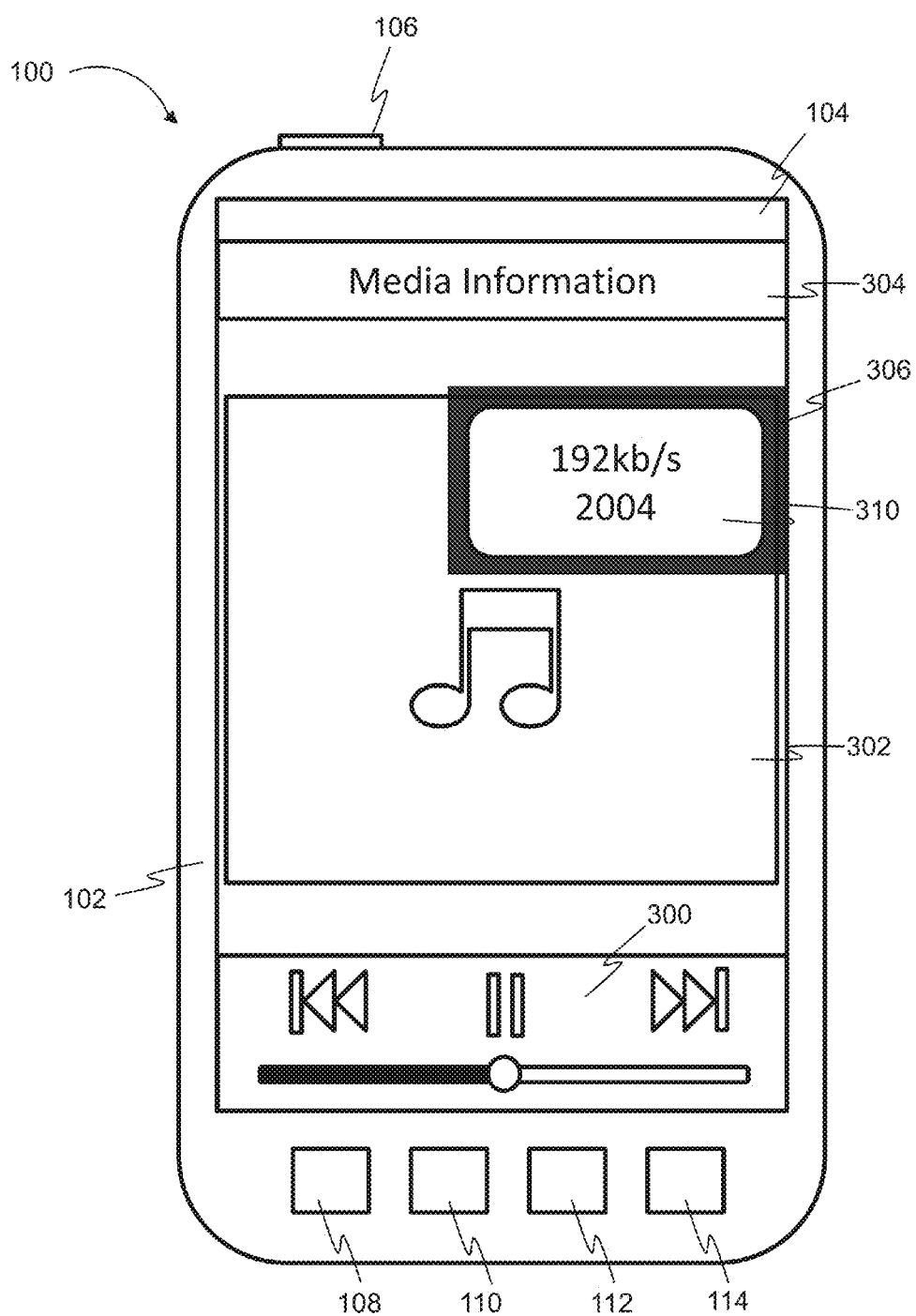
FIG. 18 shows a front view of a mobile telephony device according to an embodiment.

FIG. 18 shows a front view of a mobile telephony device according to embodiments. Similarly to FIG. 17, the overlay portion 306 includes a graphical overlay portion 310 displaying graphical content. In this example, the graphical content is in the form of textual content comprising additional media information pertaining to the music media file currently being played by the music media player application. Displaying the additional media information pertaining to the music media file may provide the user with a richer user experience in relation to their using of the mobile telephony device than would be possible from using just the media player application alone.

In the case that the music media file is an mp3 (Moving Picture Experts Group-2 Audio Layer 3) music media file, application software of embodiments may obtain the additional media information pertaining to the music media file from metadata in an ID3 tag associated with the mp3 music media file. In this case, the additional medial information may comprise mp3 bit rate information and information of the year in which the music was released. Alternatively, the additional media information pertaining to the music media file may be obtained from a network-based lookup service which takes, for example, the available media information for the music media file as an input and provides the additional media information as an output.

In some of the embodiments described above in relation to FIGS. 17 and 18, overlay portion may not comprise any touch-sensitive screen regions. In such embodiments, the user of the mobile telephony device 100 may be unable to interact with the application software of embodiments via the overlay portion 306.

Figure 19:
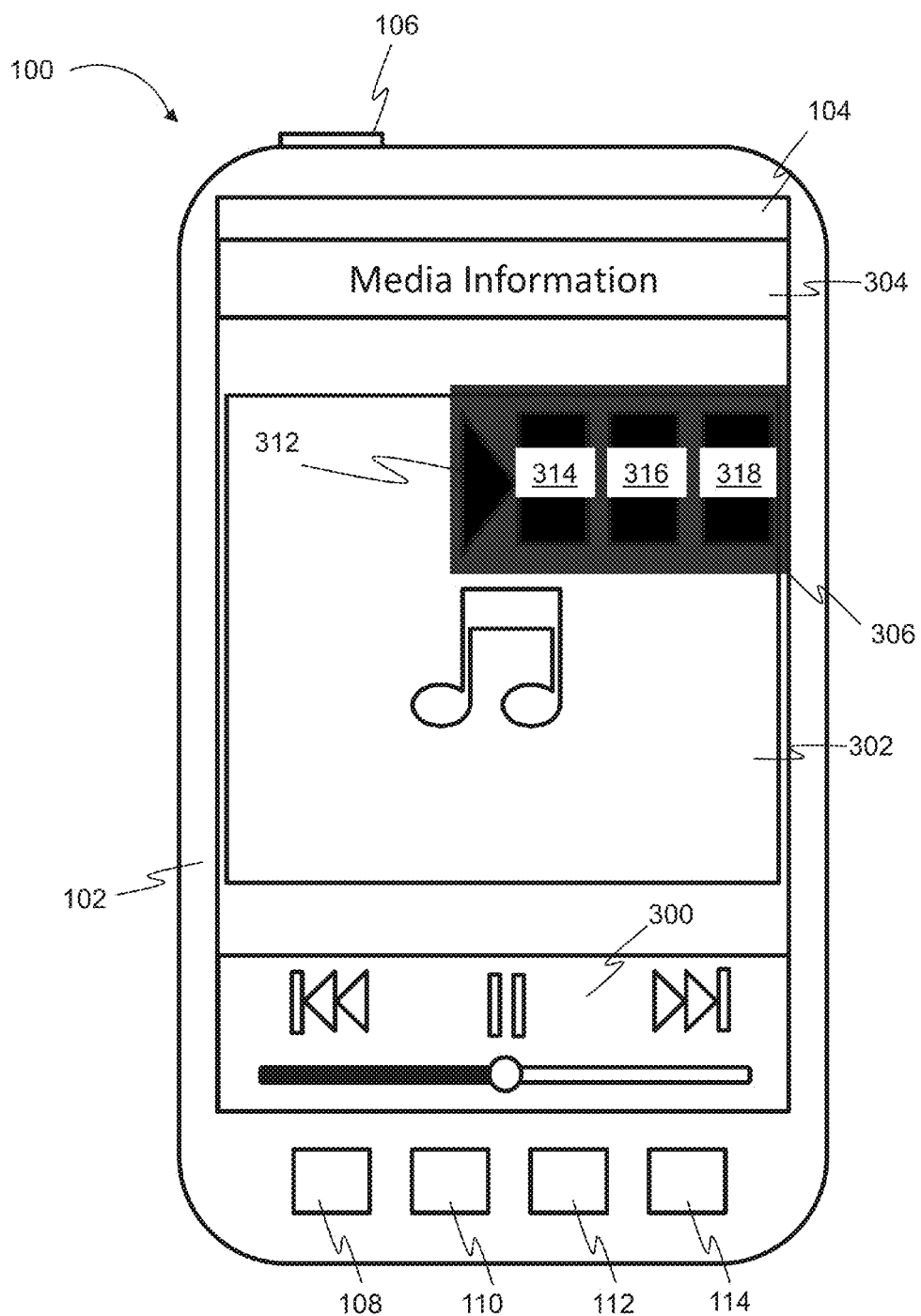
FIG. 19 shows a front view of a mobile telephony device according to an embodiment.

FIG. 19 shows a front view of a mobile telephony device according to embodiments. In these embodiments, the overlay portion 306 includes four touch-sensitive screen regions 312, 314, 316, 318 which are operable to initiate one or more operations of mobile telephony device 100, independently of the predetermined application (in this example the media player application), in response to user input via touch-sensitive screen regions 312, 314, 316, 318. In other embodiments, the overlay portion 306 may comprise a different number of touch-sensitive screen regions.

User input via touch-sensitive screen regions 312, 314, 316, 318 is passed to the application software of embodiments rather than to the media player application displaying the media player screen below the overlay portion 306. Accordingly, touching any of the touch-sensitive screen regions 312, 314, 316, 318 will not provide the user input associated with touching the part of the media player screen below the just-touched touch-sensitive screen region 312, 314, 316, 318 to the media player application, but rather will be passed to the application software of embodiments for processing.

In some embodiments, an application software operation initiated via a touch-sensitive screen region of overlay portion 306 may comprise transmitting a command or instruction to a different software application, other than the application software of embodiments, installed and/or running on mobile telephony device 100. For example, a command could be sent to open a different software application such as a camera application, a mapping application, a file browsing application, an address book application, a web browser application, a file download application, a media player application, a media editing application, a messaging application or suchlike.

In these embodiments, one of the touch-sensitive screen regions 312 is displayed in graphics as an arrow and so acts as a visual indicator to the user of the mobile telephony device 100 that, for example, it may be used to vary the size of the overlay portion 306 as described in detail above. In other embodiments, that touch-sensitive screen region 312 may be operable to initiate a different operation in response to the user of the mobile telephony device 100 touching it. In such other embodiments, different graphics may be displayed as a visual indicator of the functionality of that touch-sensitive screen region 312.

In some of the embodiments, at least some of the other touch-sensitive screen regions 314, 316, 318 are displayed in graphics as icons. The icons act as visual indicators to the user of mobile telephony device 100 of the functionality that the user can expect if and when they touch the respective icon.

For example, an icon representing a camera lens may act as a visual indicator to the user of the mobile telephony device 100 that, by touching the icon, the application software of embodiments will issue a command to open a camera application running and/or installed at the mobile telephony device 100.

In another example, an icon representing the Internet may act as a visual indicator to the user of the mobile telephony device 100 that, by touching the icon, the application software of embodiments will issue a command to open a web browser application running and/or installed at the mobile telephony device 100. In some embodiments, opening of the web browser will cause the web browser to load web page for a default Uniform Resource Locator (URL) of a home page of the browser.

In some embodiments, the icons may be targeted, application-based icons in the sense that they are based on the application being monitored.

For example, if the media player application is being monitored, an icon representing an online concert ticket merchant may act as a visual indicator to the user of the mobile telephony device 100 that, by touching the icon, the application software of embodiments will issue a command to open a web browser application running and/or installed at the mobile telephony device 100, with the web browser being directed to the website of the online concert ticket merchant. For example, the web browser may be caused to load a web page for the Uniform Resource Locator (URL) of the home page of the online concert ticket merchant. Alternatively, or in addition, the online concert ticket merchant may have developed an application that is already installed and/or running on the mobile telephony device 100. In such a case, by touching the icon representing the online concert ticket merchant, the application software of embodiments will issue a command to open application for the online concert ticket merchant running and/or installed at the mobile telephony device 100.

In another example, an icon may represent a link to a file that can be downloaded and, in some cases, must be purchased prior to downloading. The file could for example be a software application (e.g. a game), a software component (e.g. a plug-in), audio data (e.g. an mp3 (Moving Picture Experts Group-2 Audio Layer 3) music file), image data (e.g. a photo), and video data (e.g. a Moving Picture Experts Group-4 file).

For example, the user of the mobile telephony device 100 may be presented with an icon for downloading a predetermined application file. Such predetermined application file may be recommended to the user based on previous application file downloads, based on the application software being monitored or based on another factor on which a recommendation could be based. If the user of the mobile telephony device wishes to download the recommended application file, the user touches the icon representing the recommended application file that they wish to download. In some embodiments, a link, for example a URL, to an app store where the recommended application file can be purchased and downloaded, is then sent to the user of the mobile telephony device 100. The user may follow the link of their own volition.

In other embodiments, selection of the icon representing the recommended application file causes the application software of embodiments to transmit a command to an application download application installed and/or running at the mobile telephony device 100 to open to enable the user to purchase and download the application file. The command to open the application download application may identify the recommended application so that the user can be presented with the purchase and download options for the recommended application file as soon as the application download application opens.

In some embodiments, purchasing and downloading of a recommended application file using the application download application may be operable to associate a predetermined affiliate with the recommended download. In this way, the app store is notified of the identity of the affiliate whose recommendation led to the purchase and download of the application file and can credit the affiliate accordingly. The app store may pay the affiliate a bounty (perhaps a fixed fee or a percentage of the purchase price) for each application bought via an affiliate recommendation. Affiliates may be associated with the download of recommended files other than application files.

In such embodiments, download of the recommended file may be tracked such that when the recommended file is downloaded, the predetermined affiliate is associated with the download such that the recommendation of the file for download by or via the predetermined affiliate can be recognized and the predetermined affiliate credited or otherwise rewarded accordingly. Tracking of the download may be enabled via use of an affiliate identifier that identifies the appropriate predetermined affiliate.

Similarly, in some embodiments, access to a recommended website or an advertised website may tracked such that when the recommended or advertised website is accessed, a predetermined affiliate is associated with the access such that the recommendation of the recommended or advertised website by or via the predetermined affiliate can be recognized and the predetermined affiliate credited or otherwise rewarded accordingly. Tracking of the access to the recommended or advertised website may be enabled via use of an affiliate identifier which identifies the appropriate predetermined affiliate. The URL of the recommended or advertised website to which the user is directed may comprise or be based on the affiliate identifier.

In some embodiments, the predetermined affiliate comprises the provider of, developer of, or another entity associated with, the monitored application. In such embodiments, the affiliate identifier may comprise an identity associated with the monitored application, such as an application identifier for the monitored application. Such affiliation with the provider of, developer of, or another entity associated with, the monitored application may reduce or altogether obviate the need for the monitored application to include advertisements or similar forms of revenue generators.

In other embodiments, the predetermined affiliate comprises the provider of, developer of, or another entity associated with, the application software of embodiments. In such embodiments, the affiliate identifier may comprise an identity associated with the application software of embodiments, such as an application identifier for the application software of embodiments. Such affiliation with the provider of, developer of, or another entity associated with, the application software of embodiments may increase revenue so that the application software can be provided at a reduced cost or at no cost to the user.

Similarly to embodiments described above in relation to FIGS. 5 and 6 above, a user of the mobile telephone device 100 may be able to vary the size and/or position of the part of the screen displayed by the predetermined application which is configured as the overlay portion in response to user input via touch-sensitive screen regions 312, 314, 316, 318.

Embodiments comprise a method of controlling a computing device including a touch-screen user interface, the method comprising:

monitoring a status of one or more applications having access to the touch-screen user interface of the computing device;

in response to the monitoring indicating that a predetermined application is displaying a screen on the touch-screen user interface, using a different application to configure at least one overlay portion over a part of the displayed screen; and allowing user input received via the touch-screen user interface in one or more predefined touch-sensitive screen regions to pass to the predetermined application for processing while the overlay portion is active.

In embodiments, configuring the at least one overlay portion includes configuring one or more overlay touch-sensitive screen areas which initiate one or more operations of the computing device, independently of operations which are configured to be initiated via the predetermined application, in response to user input via the one or more overlay touch-sensitive screen areas.

Embodiments comprise varying the size of the part of the displayed screen configured as the at least one overlay portion in response to user input via one or more of the overlay touch-sensitive screen areas.

In embodiments, the user input via the one or more of the overlay touch-sensitive screen areas includes a sliding action in a predetermined direction over the at least one overlay portion beginning at an overlay touch-sensitive screen area, wherein the size of at least one of the at least one overlay portion is reduced in response to the sliding action.

In embodiments, the user input via the one or more of the overlay touch-sensitive screen areas includes a sliding action in a predetermined direction over the at least one overlay portion beginning at an overlay touch-sensitive screen area, wherein the size of at least one of the at least one overlay portion is increased in response to the sliding action.

Embodiments comprise varying the number of the one or more overlay touch-sensitive screen areas within the at least one overlay portion in conjunction with the size variation of the at least one overlay portion.

Embodiments comprise varying the location of the part of the displayed screen configured as the at least one overlay portion in response to user input via one or more of the overlay touch-sensitive screen areas.

In embodiments, the at least one overlay portion includes a graphical overlay portion visible above the part of the displayed screen.

In embodiments, the at least one overlay portion includes a touch-sensitive overlay portion which is not visible above the part of the displayed screen.

In embodiments, the touch-sensitive overlay portion includes the one or more touch-sensitive screen regions, wherein the graphical overlay portion is not responsive to user input within an overlay region of the touch-screen user interface which is not occupied by said touch-sensitive overlay portion, and wherein the graphical overlay portion depicts the appearance of the one or more overlay touch-sensitive screen areas within an overlay region of the touch-screen user interface which is occupied by said touch-sensitive overlay portion.

In embodiments, when the size and/or location of the overlay portion over the displayed screen is varied in response to user input via the one or more of the overlay touch-sensitive screen areas, the method further comprising:

displaying, via the visible graphical overlay portion of the at least one overlay portion, an animation of the visible graphical overlay portion varying from its unvaried size and/or location to its varied size and/or location; and reconfiguring the invisible touch-sensitive overlay portion of the at least one overlay portion to its varied size and/or location.

In embodiments, at least a part of the graphical overlay portion includes a transparent or translucent graphical part such that the part of the screen displayed by the predetermined application below the transparent or translucent graphical part is at least partially visible through the transparent or translucent graphical part.

In embodiments, at least a part of the graphical overlay portion includes an opaque part such that the part of the screen displayed by the predetermined application below the opaque part of the graphical overlay portion is not visible through the opaque part.

Embodiments comprise transmitting an application identifier for the predetermined application to a content provider and receiving, from the content provider, targeted graphical content for display on the graphical overlay portion, the graphical content being targeted to the computing device based on the identity of the predetermined application.

Embodiments comprise displaying on the graphical overlay portion graphical content that is not being displayed on the screen displayed by the predetermined application.

In embodiments, the graphical overlay portion includes one or more icons representing one or more overlay touch-sensitive screen areas.

In embodiments, at least one of said one or more operations includes sending an instruction to a software application different from the predetermined application.

In embodiments, the instruction includes an instruction to open one or more of the following on the computing device:
 a camera application;
 a mapping application;
 a file browsing application;
 an address book application;
 a web browser application;
 a file download application;
 a media player application;
 a media editing application; and
 a messaging application.

In embodiments, the instruction includes an instruction to open the web browser application at a predetermined network address.

In embodiments, the predetermined network address includes a Uniform Resource Locator.

In embodiments, the Uniform Resource Locator includes or is based on an affiliate identifier.

Embodiments comprise allowing user input received via the touch-screen user interface outside at least one of the at least one overlay portions to pass to the predetermined application for processing.

Embodiments comprise allowing user input received via the touch-screen user interface within at least one of the at least one overlay portions to pass to the predetermined application for processing.

Embodiments comprise removing the configuration of the at least one overlay portion in response to the monitoring indicating that the predetermined application has ceased to display the screen on the touch-screen user interface.

In embodiments, the computing device is a mobile telephony device, the predetermined application comprises an in-call screen application, and the displayed screen comprises an in-call screen displayed during a call conducted by the mobile telephony device.

In embodiments, the status of the one or more applications is updated upon occurrence of a given operating system event of the computing device.

In embodiments, the given operating system event is listed at a certain position of a task-list of the operating system of the computing device.

The above embodiments are to be understood as illustrative examples. Further embodiments are envisaged.

For example, embodiments could be applied to computing devices which do have touch-screen user interfaces, but which do not have telephony capabilities. Further, embodiments could be applied to devices having display screens, but without touch-screen user interfaces; in such cases, the overlay portion can be employed as a display overlay which is not responsive to user input via touches on the display screen.

In the embodiments described above, computing device 100 comprises an example mobile telephony device 100 and the embodiment is described as application software installed or otherwise running on mobile telephony device 100. Embodiments may equally be applied to a non-mobile computing device and/or a computing device without telephony capabilities such as a personal computer (PC) or suchlike. Further, embodiments need not necessarily comprise application software running on a mobile telephony device, but could comprise logic programmed into Read Only Memory (ROM) within a computing device during manufacture or code incorporated into an operating system installed on a computing device.

In the above-described embodiments, both call parties transmit, either from the telephony device, or an associated device, call party identifiers for each party to the server in the process of setting up the separate data communications session. These call party identifiers are, in the embodiments described, both telephony dialing numbers (TDNs). In alternative embodiments, one party or both parties may be identified by another form of call party identifier, using for example one or more lookup mechanisms which map a telephony dialing number to a different unique identifier and/or vice-versa (examples of such alternatives are described in further detail below.) However, such lookup mechanisms may increase latency and may introduce unexpected errors (e.g. if a lookup database such as an address book is not kept up to date.) Hence, whilst it is not indeed necessary for either party to transmit a telephony dialing number of either party (since either party may be identified by other mechanisms), it is preferred that at least one of the devices includes the telephony dialing number of the other party. Indeed, whilst it is again not necessary, it is preferred that both parties transmit the telephony dialing number of the other party, if available, to the server, during the session setup. Furthermore, in order at least to reduce latency at the server, and/or to reduce the need to maintain a separate store of identities and/or to reduce the need to implement a registration mechanism, it is preferred that both parties transmit both their own telephony dialing number and the telephony dialing number of the other party, if available, to the server, during the session setup. If a call party is identifiable using an additional identifier, such as an extension number or a conference call ID, the additional identifier may be transmitted in association with both of the telephony dialing numbers, if available, by one or each party to the call.

As mentioned above, in alternative embodiments, one, or each, of the call parties may transmit, either from the telephony device, or an associated device, a unique identifier in the form other than that of a telephony dialing number which is nonetheless recognizable by the server. A user device which interacts with the server may thus transmit the unique identifier to identify one party, or both parties, as a party to the call, instead of a telephony dialing number. For example, the server may have access to a data store which includes a set of unique identifiers for all subscribers registered to receive the service provided by the server, along with a corresponding telephony dialing number for a telephony device associated with each respective unique identifier. Such unique identifiers may be allocated by the server during an initial registration procedure, and notified to, and stored by, an application on the user device which interacts with the server during the registration procedure. Other globally unique identifiers, such as email addresses, Facebook™ IDs, etc. may be used alternatively, or in addition, to such allocated unique identifiers.

In embodiments, at least one of the two call parties may use a Voice-over-Internet-Protocol (VoIP) enabled device or other device employing the session Initiation Protocol (SIP). One, or each, party may be identified in the call setup procedures by means of a unique SIP user identifier which may include a telephone dialing number as a user identifier or a user identifier other than a telephony dialing number, for example a SIP identifier in the form of username@hostname. Thus, a SIP user identifier can be transmitted to the server as a call party identifier identifying at least one, or each, participant in the call.

In embodiments, a call party identifier may take the form of an Internet Protocol (IP) address, which may be either a static or dynamically allocated IP address. This may for example be the IP address which a user device transmits to the server in a client-server connection setup request, for example an HTTP setup request, when establishing a leg of the communications session. This may uniquely identify the call party associated with the device making the request. If for example, a given party sends the telephony dialing number of only the other party to the server in the session setup procedure, then that given party can nevertheless be identified as a party to the call using the IP address of that given party's device used in establishing the session leg. The supplied IP address may then be used to send data to that given party's device throughout the ensuing communications session, even if the IP address is only temporarily allocated to the user device as a dynamic IP address. Hence, a static or dynamic IP address may be used, in some embodiments, to identify a call party and may be one of the call party identifiers which forms part of the call party details transmitted to the server, e.g. in a connection setup request during session establishment.

In embodiments, a call party identifier may take the form of a session identifier, or other unique identifier, generated by the server and received from the server by a user device in a push notification message. Such a push notification message may be sent from the server in response to the server receiving call party details from the other party to the call, in a first communication session leg. The push notification message is configured, on receipt, to trigger the user device to set up a second communication session leg with the server. The user device may be configured to include the identifier received in the push notification as a call party identifier in a client-server connection setup request, for example an HTTP setup request, when establishing the communications session leg in response to the push notification message. This may uniquely identify the call party associated with the device making the request, since such identifier may be mapped to the telephony dialing number, or other call party identifier, by the server. Hence, an identifier received in a push notification message may be used, in some embodiments, to identify a call party and may be one of the call party identifiers which forms part of the call party details transmitted to the server, e.g. in a connection setup request during session establishment.

A unique identifier in any of the various forms described above, in a form other than that of a telephony dialing number, may be used to identify a given party to the call, in call party details transmitted by a user device associated with that given party. A unique identifier in any of the various forms described, in a form other than that of a telephony dialing number, may in addition, or in the alternative, be used to identify another party to the call, in call party details transmitted by that given party. The server may supply the unique identifiers of other parties, using e.g. a synchronization process for populating an address book locally stored on the user device with such identifiers. Alternatively, such unique identifiers of other parties may already be stored by, or manually added by a user of the device, in the local address book. Further alternatively, the unique identifiers may be stored in a global address book stored on a remote device. At least one of the two parties may have a user device which is configured to look up, from a local data store (e.g. a local address book) or a remote data store (e.g. a global address book), a correspondence between the other party's telephone dialing number, or other received unique identifier, and a different unique identifier. The different unique identifier may then be used instead to identify the other party to the call in the call party details transmitted by at least one side of the call to the server.

In the above, various forms of alternative call party identifiers are described. Whatever form the supplied unique identifier takes, the server may have a corresponding database and lookup mechanism to map a supplied unique identifier to a different call party identifier, such as a telephony dialing number, whereby to match both session legs together as relating to a particular current telephone call, using the information supplied in each respective one of the session legs. The server can then bridge the two session legs together, or otherwise associate the two session legs, to create a separate communications session between the participants in a currently ongoing call.

In the above described embodiments, whilst a different form of call party identifier may be used in some cases, in a generally accessible telephony system at least one of the two parties may have no access to identifying details other than the telephony dialing number of the other call party when the call is established. Hence, the system may be configured such that at least one of the two parties may transmit the call party identifier of the other party to the server in the form of a telephony dialing number, and that the server is able to process one or more call party details in such a form in order to establish the separate communications session.

In alternative embodiments, rather than both call parties transmitting both calling party and called party identifiers to identify the parties to a call, at least one of the parties may transmit only one of the two call party identifiers to the server. This may be done according to a predetermined convention, e.g. a convention which determines that the calling party should always transmit both identifiers but the called party need only transmit one identifier (or vice-versa). Again, the server is nevertheless able to match both session legs together as relating to a particular current telephone call, using the information supplied in both of the session legs. In this case, it is sufficient that at least one common call participant, namely that participant which is determined by convention to be identified by each party to the call, has been identified in each session leg.

In some circumstances, the telephony dialing number, or other call party identifier, of the other party may not be received at all during the call setup procedures. For example, the other party may use a number withholding service. Hence, an identifier for the other party may not be available to the user device. In this case, the user device may be able, during the setup of the separate communications session, to identify only its associated call party (and not the other call party) to the server as a party to the call. However, providing both sides of the call do not use a number withholding service, the other party's device may be able identify both parties to the call, and may transmit call party details identifying both call parties to the server during session establishment. Again, the server is nevertheless able to match both session legs together as relating to a particular current telephone call, using the information supplied in both of the session legs. Again, in this case, it is sufficient that at least one common call participant, namely the participant not using a number withholding service, has been identified in both session legs.

In the above-described embodiments the mobile stations MS A, MS B communicate via a PLMN. Such a PLMN may be any of a variety of different cellular communications network types, including a 2G network such as a Global System for Mobile communications (GSM) network, a 3G network, such as a Universal Mobile Telecommunications System (UMTS) network or a 4G network such as a Long Term Evolution (LTE or LTE Advanced) network. Whilst the call setup and call data flow may be conducted via the PLMN, the communications relating to the separate data communications session, e.g. communications with the server, may be conducted via a different radio access network (RAN), such as a wireless local area network (WLAN) based on the IEEE 802.11 standards.

In the above-described embodiments, the server is described as a single computing device located in a single network location. However, it should be understood that the server may consist of a distributed set of computing devices or applications, either co-located in a single network location, or dispersed in different network locations.

In embodiments, an application performing status monitoring is different from the monitored application. In alternative embodiments, an application performing status monitoring is the same as the monitored application.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which are defined in the accompanying claims.

What is claimed is:

1. A method of controlling a mobile telephony device comprising a touch-screen user interface, the method comprising:
   monitoring a status of one or more applications having access to the touch-screen user interface of the mobile telephony device; and
   in response to the monitoring indicating that a telephony application is displaying an in-call screen on the touch-screen user interface during a call conducted by the mobile telephony device, configuring at least one overlay portion over a part of the displayed in-call screen,
   wherein configuring the at least one overlay portion comprises configuring one or more touch-sensitive screen regions which are operable to initiate one or more operations of the mobile telephony device in response to user input via the one or more touch-sensitive screen regions,
   wherein the at least one overlay portion comprises:
      a touch-sensitive overlay portion which comprises the one or more touch-sensitive screen regions and which is not visible above the part of the displayed in-call screen; and
      a graphical overlay portion which is visible above the part of the displayed in-call screen and through the touch-sensitive overlay portion, which is not responsive to user input within the at least one overlay portion of the touch-screen user interface, and which depicts the appearance of the one or more touch-sensitive screen regions, and
   wherein, when the size of the at least one overlay portion is varied in response to user input via the one or more touch-sensitive screen regions, the method comprises:
      displaying, via the visible graphical overlay portion of the at least one overlay portion, an animation of the at least one overlay portion varying from its unvaried size to its varied size without changing the size of the visible graphical overlay portion;
      reconfiguring the visible graphical overlay portion of the at least one overlay portion in its varied size; and
      reconfiguring the invisible touch-sensitive overlay portion of the at least one overlay portion in its varied size after the reconfiguration of the visible graphical overlay portion.

2. A method according to claim 1, wherein the one or more touch-sensitive screen regions are operable to initiate the one or more operations of the mobile telephony devices independently of the telephony application in response to user input via the one or more touch-sensitive screen regions.

3. A method according to claim 1, wherein:
   the user input via the one or more touch-sensitive screen regions comprises a sliding action in a first given direction over the at least one overlay portion beginning at one of the touch-sensitive screen regions, wherein the size of the at least one overlay portion is reduced in response to the sliding action, or
   the user input via the one or more touch-sensitive screen regions comprises a sliding action in a second given direction over the at least one overlay portion beginning at one of the touch-sensitive screen regions, wherein the size of the at least one overlay portion is increased in response to the sliding action.

4. A method according to claim 1, comprising varying a number of the one or more touch-sensitive screen regions within the at least one overlay portion in conjunction with varying the size of the at least one overlay portion.

5. A method according to claim 1, comprising varying the location of the at least one overlay portion in response to user input via the one or more touch-sensitive screen regions.

6. A method according to claim 1, wherein: at least a first part of the graphical overlay portion comprises a translucent layer such that the part of the in-call screen displayed by the telephony application below the at least first part of the graphical overlay portion is partially visible through the at least first part of the graphical overlay portion, and/or
   at least a second part of the graphical overlay portion comprises an opaque layer such that the part of the in-call screen displayed by the telephony application below the at least second part of the graphical overlay portion is not visible through the at least second part of the graphical overlay portion.

7. The method according to claim 1, wherein an instruction comprises an instruction to open one or more of the following on the mobile telephony device:
   a camera application;
   a mapping application;
   a file browsing application;
   an address book application;
   a web browser application;
   a file download application;
   a media player application;
   a media editing application; and
   a messaging application.

8. A method according to claim 7, wherein the instruction comprises an instruction to open the web browser application at a predetermined network address.

9. A method according to claim 8, wherein the predetermined network address comprises a Uniform Resource Locator including or based on an affiliate identifier.

10. A method according to claim 1, further comprising:
    allowing user input received via the touch-screen user interface outside the at least one overlay portion to pass to the telephony application for processing, and/or
    allowing user input received via the touch-screen user interface within the at least one overlay portion to pass to the telephony application for processing.

11. A method according to claim 1, further comprising removing the configuration of the at least one overlay portion over the part of the in-call screen displayed by the telephony application in response to the monitoring indicating that the telephony application has ceased to display the in-call screen on the touch-screen user interface.

12. A method according to claim 1, wherein the status of the one or more applications is updated upon occurrence of a given operating system event of the mobile telephony device.

13. A method according to claim 12, wherein the given operating system event is listed at a certain position of a task-list of the operating system of the mobile telephony device.

14. The method of claim 1, wherein the one or more operations comprise sending an instruction to a software application different from the telephony application on the mobile telephony device.

15. A mobile telephony device comprising:
at least one processor and at least one memory, wherein the at least one processor is configured to:
monitor a status of one or more applications having access to a touch-screen user interface of the mobile telephony device; and
in response to the monitoring indicating that a telephony application is displaying an in-call screen on the touch-screen user interface during a call conducted by the mobile telephony device, configure at least one overlay portion over a part of the displayed in-call screen,
wherein configuring the at least one overlay portion comprises configuring one or more touch-sensitive screen regions which are operable to initiate one or more operations of the mobile telephony device in response to user input via the one or more touch-sensitive screen regions,
wherein the at least one overlay portion comprises:
a touch-sensitive overlay portion which comprises the one or more touch-sensitive screen regions and which is not visible above the part of the displayed in-call screen; and
a graphical overlay portion which is visible above the part of the displayed in-call screen and through the touch-sensitive overlay portion of the touch-screen user interface, and which depicts the appearance of the one or more touch-sensitive screen regions, and
wherein, when the size of the at least one overlay portion is varied in response to user input via the one or more touch-sensitive screen regions, the processor is configured to:
display, via the visible graphical overlay portion of the at least one overlay portion, an animation of the at least one overlay portion varying from its unvaried size to its varied size without changing the size of the visible graphical overlay portion;
reconfigure the visible graphical overlay portion of the at least one overlay portion in its varied size; and
reconfigure the invisible touch-sensitive overlay portion of the at least one overlay portion in its varied size after the reconfiguration of the visible graphical overlay portion.

16. A computer program product comprising a non-transitory computer-readable storage medium having computer readable instructions stored thereon, the computer readable instructions being executable by a mobile telephony device to cause the mobile telephony device to perform a method comprising:
monitoring a status of one or more applications having access to a touch-screen user interface of the mobile telephony device; and
in response to the monitoring indicating that a telephony application is displaying an in-call screen on the touch-screen user interface during a call conducted by the mobile telephony device, configuring at least one overlay portion over a part of the displayed in-call screen,
wherein configuring the at least one overlay portion comprises configuring one or more touch-sensitive screen regions which are operable to initiate one or more operations of the mobile telephony device in response to user input via the one or more touch-sensitive screen regions,
wherein the at least one overlay portion comprises:
a touch-sensitive overlay portion which comprises the one or more touch-sensitive screen regions and which is not visible above the part of the displayed in-call screen; and
a graphical overlay portion which is visible above the part of the displayed in-call screen and through the touch-sensitive overlay portion, which is not responsive to user input within the at least one overlay portion of the touch-screen user interface, and which depicts the appearance of the one or more touch-sensitive screen regions, and
wherein, when the size of the at least one overlay portion is varied in response to user input via the one or more touch-sensitive screen regions, the method comprises:
displaying, via the visible graphical overlay portion of the at least one overlay portion, an animation of the at least one overlay portion varying from its unvaried size to its varied size without changing the size of the visible graphical overlay portion;
reconfiguring the visible graphical overlay portion of the at least one overlay portion in its varied size; and
reconfiguring the invisible touch-sensitive overlay portion of the at least one overlay portion in its varied size after the reconfiguration of the visible graphical overlay portion.

17. A computer program product according to claim 16, wherein the computer program product comprises application software for the mobile telephony device.

* * * * *